(12) United States Patent  (10) Patent No.: US 9,001,430 B2
Wang et al.  (45) Date of Patent: Apr. 7, 2015

(54) LENS MODULE AND IMAGE APPARATUS

(75) Inventors: Kuo-Chuan Wang, Hsinchu (TW);
Sheng-Tang Lai, Hsinchu (TW)

(73) Assignee: Young Optics Inc., Hsinchu (TW)

(*) Notice: Subject to any disclaimer, the term of this patent is extended or adjusted under 35 U.S.C. 154(b) by 208 days.

(21) Appl. No.: 13/557,222

(22) Filed: Jul. 25, 2012

(65) Prior Publication Data

US 2013/0155314 A1 Jun. 20, 2013

(30) Foreign Application Priority Data

Dec. 15, 2011 (TW) .............................. 100146540 A

(51) Int. Cl.
*G02B 15/14* (2006.01)
*G02B 15/173* (2006.01)
*G02B 15/28* (2006.01)

(52) U.S. Cl.
CPC .............. *G02B 15/173* (2013.01); *G02B 15/28* (2013.01)

(58) Field of Classification Search
CPC ........ G02B 15/00; G02B 15/14; G02B 15/20; G02B 15/24
USPC .......................... 359/714, 676–685, 763–764
See application file for complete search history.

(56) References Cited

U.S. PATENT DOCUMENTS

| | | | |
|---|---|---|---|
| 5,299,064 A | 3/1994 | Hamano et al. | |
| 5,414,562 A | 5/1995 | Ueda | |
| 5,548,445 A | 8/1996 | Yahagi | |
| 5,659,426 A | 8/1997 | Aoki | |
| 6,738,196 B2 | 5/2004 | Yamamoto | |
| 6,870,689 B2 | 3/2005 | Yoshida | |
| 6,924,938 B2 * | 8/2005 | Nishina et al. | 359/687 |
| 6,989,940 B2 | 1/2006 | Nagahara | |
| 7,227,693 B2 | 6/2007 | Nakazawa et al. | |
| 7,280,286 B2 * | 10/2007 | Hayakawa | 359/686 |
| 7,369,313 B2 * | 5/2008 | Otake | 359/557 |
| 7,417,802 B2 * | 8/2008 | Horiuchi | 359/687 |
| 2004/0184160 A1 * | 9/2004 | Nishina et al. | 359/690 |
| 2007/0291375 A1 * | 12/2007 | Ohtake et al. | 359/687 |
| 2008/0212184 A1 * | 9/2008 | Ohtake | 359/557 |
| 2008/0304161 A1 * | 12/2008 | Souma | 359/683 |
| 2009/0116121 A1 * | 5/2009 | Take | 359/687 |

* cited by examiner

*Primary Examiner* — Thong Nguyen
(74) *Attorney, Agent, or Firm* — Jianq Chyun IP Office

(57) ABSTRACT

A lens module for capturing an object light-beam from an object-side is provided. The lens module includes a first lens group, a second lens group, a third lens group, a fourth lens group and a fifth lens group sequentially-arranged from the object-side to an image-side. The five lens groups respectively have at least one lens with positive refractive-power and at least one lens with negative refractive-power. The first, third and fifth lens groups are fixed groups, while the second and fourth lens groups are movable groups. An image apparatus including the lens module is also provided.

28 Claims, 22 Drawing Sheets

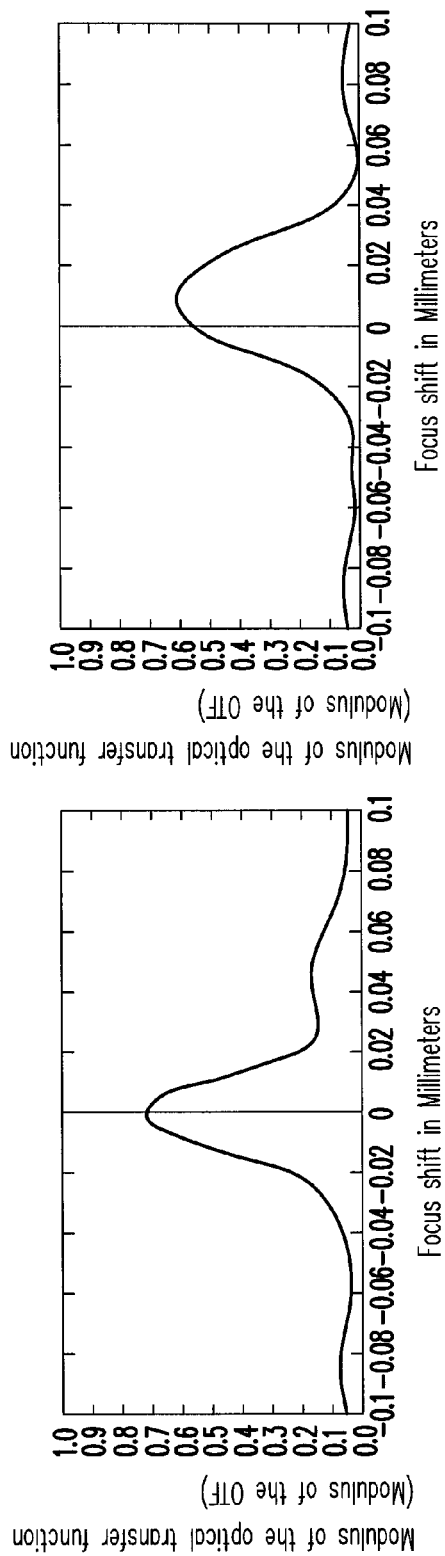
FIG. 3A
FIG. 3B
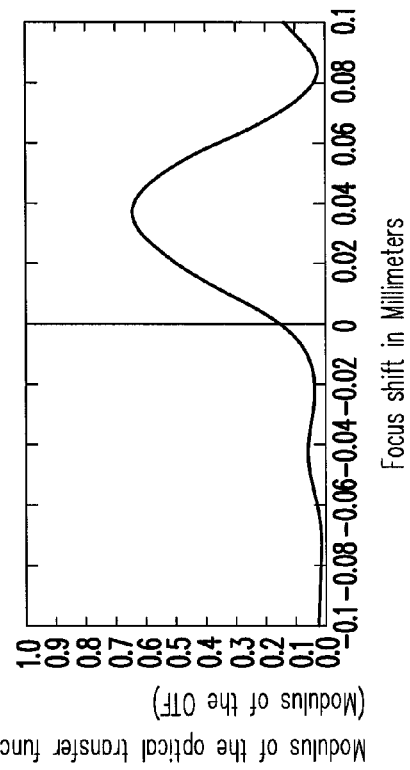
FIG. 3C
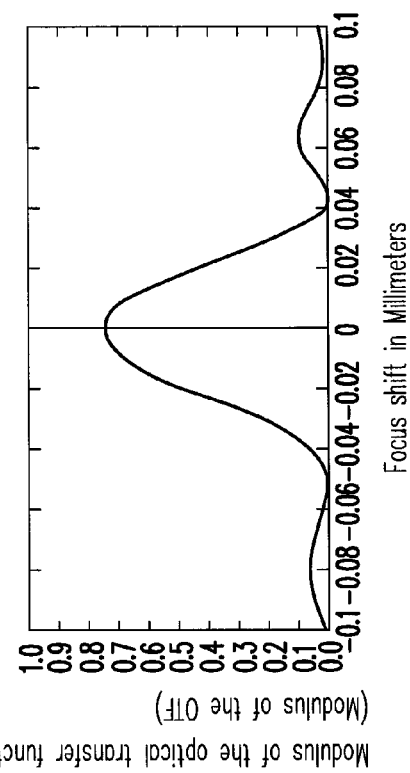
FIG. 3D

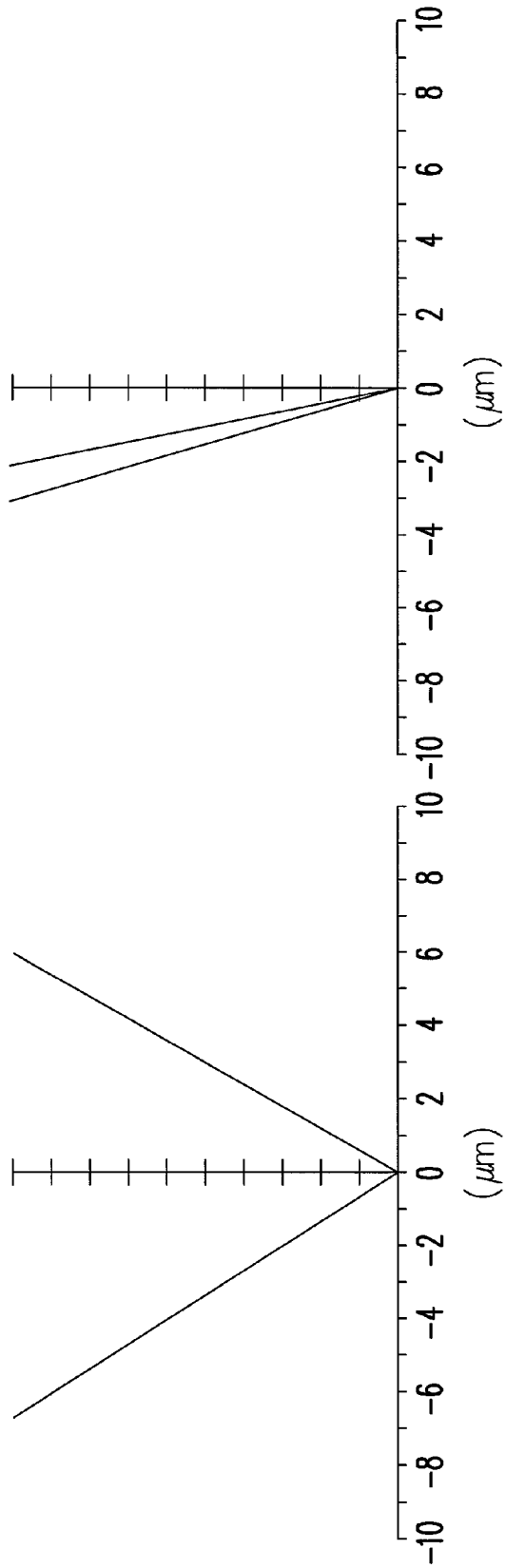

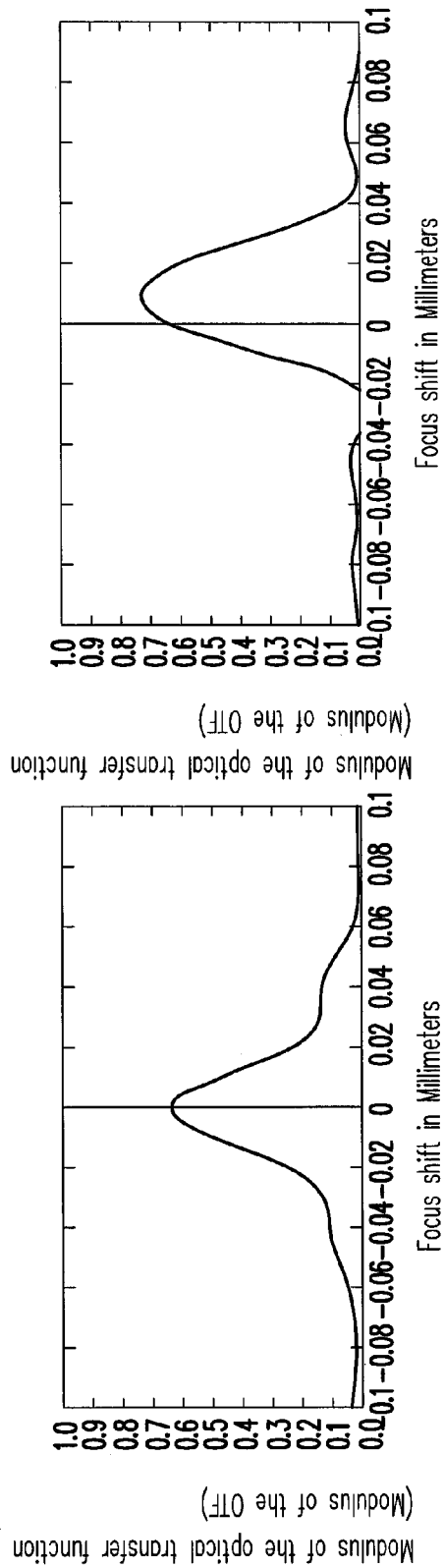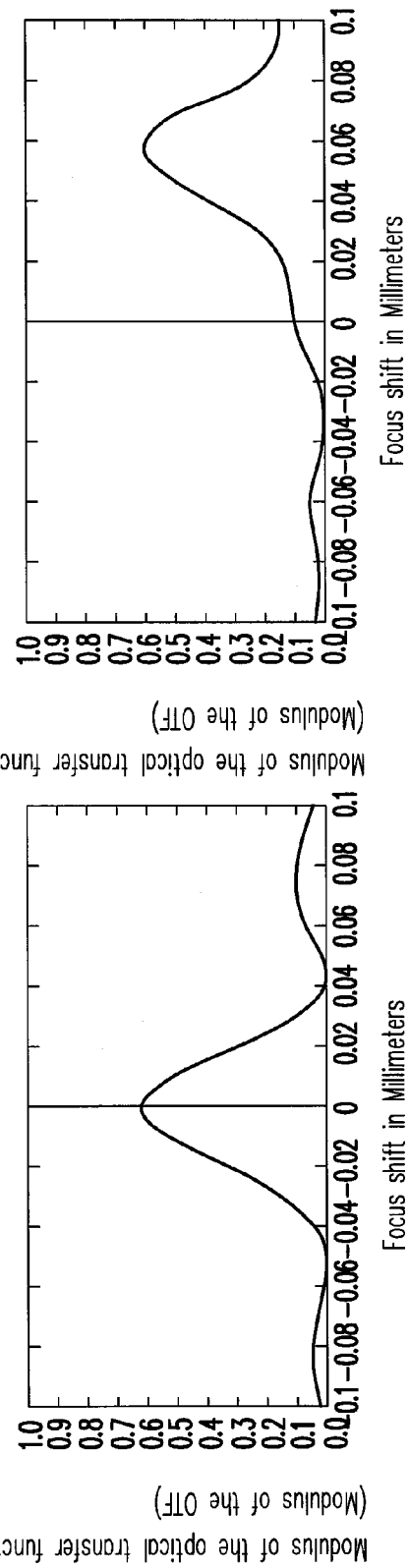
FIG. 9A  FIG. 9B  FIG. 9C  FIG. 9D

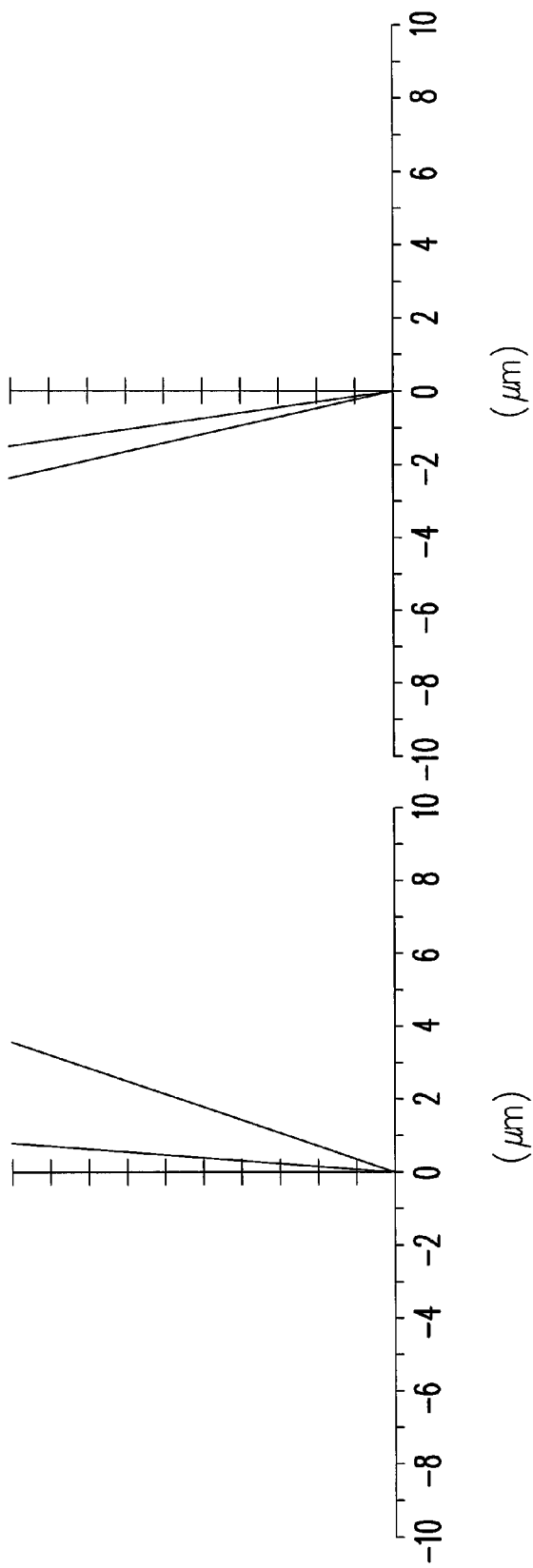

LENS MODULE AND IMAGE APPARATUS

CROSS-REFERENCE TO RELATED APPLICATION

This application claims the priority benefit of Taiwan application serial no. 100146540, filed on Dec. 15, 2011. The entirety of the above-mentioned patent application is hereby incorporated by reference herein and made a part of this specification.

BACKGROUND OF THE INVENTION

1. Field of the Invention

The invention generally relates to an optical apparatus, and more particularly, to a lens module and an image apparatus.

2. Description of Related Art

Along with the increasing popularity of demand on the surveillance under night and low-light environments, video cameras with 24-hours surveillance function are widespread used. In general speaking, a conventional video camera uses a light-filter for switching the 24-hours surveillance modes. In more details, when an object to be shot is under an environment with adequate luminance, a light-filter would be put down to block infrared light from entering the photosensitive component. On the other hand, when an object to be shot is under an environment with insufficient luminance, an infrared light source of the video camera would be turned on to emit infrared light onto the object to be shot. At the time, the light-filter is disabled so that the infrared light reflected by the object to be shot can reach at the photosensitive component for imaging.

In the application practice however, the images captured during day normally are clear, while the images captured during night (in infrared mode) are fuzzy. The different results are caused by a too large difference between visible light and infrared light in wavelength. In more details, after the visible light and the infrared light pass through a lens module of the video camera, due to the two focal planes of the above-mentioned two lights are apart quite far from each other; in addition, due to the cost consideration, most of the commercial video cameras for surveillance are not equipped with auto-focusing function. Under such circumstances, how to design an appropriate lens module of video cameras able to capture images with good quality at day and night becomes one of important projects to solve the above-mentioned problem by the relevant developers.

U.S. Pat. No. 7,417,802 discloses a lens module including a first lens group, a second lens group, a third lens group, a fourth lens group and a fifth lens group, in which the first, the second, the third, the fourth and the fifth lens groups have positive refractive-power, negative refractive-power, positive refractive-power, positive refractive-power and positive refractive-power, respectively. U.S. Pat. No. 7,369,313 discloses a zoom lens for a video camera. The zoom lens includes a first lens group with positive refractive-power, a second lens group with negative refractive-power, a third lens group with positive refractive-power, a fourth lens group with positive refractive-power and a fifth lens group with positive refractive-power. The fourth lens group and the fifth lens group herein respectively have an aspheric lens. In addition, U.S. Pat. Nos. 7,227,693, 6,738,196, 6,870,689 and 6,989,940 disclose several types of projection lenses. U.S. Pat. Nos. 5,299,064, 5,414,562, 5,548,445 and 5,659,426 also disclose a projection lenses including multiple lens groups.

SUMMARY OF THE INVENTION

Accordingly, the invention is directed to a lens module with high performance of imaging quality.

The invention is also directed to an image apparatus with good 24-hours confocal image-capturing quality.

Other objectives, features and advantages of the invention will be further understood from the further technological features disclosed by the embodiments of the invention.

To achieve one of, a part of or all of the above-mentioned objectives, or to achieve other objectives, an embodiment of the invention provides a lens module. The lens module is located between an object-side and an image-side for capturing an object light-beam from the object-side. The lens module is disposed on a transmission path of the object light-beam and includes five lens groups sequentially-arranged from the object-side to the image-side: a first lens group, a second lens group, a third lens group, a fourth lens group and a fifth lens group. The first lens group has positive refractive-power and includes a first lens with positive refractive-power and a second lens with negative refractive-power. The second lens group has negative refractive-power and includes a third lens with positive refractive-power and a fourth lens with negative refractive-power. The third lens group has positive refractive-power and includes a fifth lens with positive refractive-power and a sixth lens with negative refractive-power. The fourth lens group has positive refractive-power and includes a seventh lens with positive refractive-power and an eighth lens with negative refractive-power. The fifth lens group has positive refractive-power and includes a ninth lens with positive refractive-power and a tenth lens with negative refractive-power. The first lens group, the third lens group and the fifth lens group herein are fixed groups, the second lens group and the fourth lens group are removable groups and any lens in the third lens group is a spherical lens.

Another embodiment of the invention provides an image apparatus, which includes the above-mentioned lens module and a photosensitive component. The photosensitive component is disposed on a transmission path of an object light-beam and located at an image-side of the image apparatus. The lens module is located between the photosensitive component and an object-side.

The above-mentioned image apparatus further includes a light-emitting component for emitting an illumination light-beam towards the object-side. The illumination light-beam has a first wavelength range and the illumination light-beam after being reflected by an object at the object-side is converted into the object light-beam. When the luminance at the object-side is less than a predetermined value, the light-emitting component is turned on to emit the illumination light-beam with the first wavelength range towards the object-side, in which the first wavelength range of the illumination light-beam is the same as the wavelength range of the infrared light.

The above-mentioned image apparatus further includes a light-filtering component for blocking the illumination light beam with the first wavelength range, in which when the luminance at the object-side is greater than the predetermined value, the light-filtering component moves on the transmission path of the object light-beam, while when the luminance at the object-side is less than the predetermined value, the light-filtering component leaves from the transmission path of the object light-beam.

In an embodiment of the invention, focal length of the second lens group of the above-mentioned lens module is f2, focal length of the lens module at a wide-end is fW, focal length of the lens module at a tele-end is fT and the lens module satisfies a following condition expression:

$$0.4 < (f2/\sqrt{fW \times fT}) < 0.6$$

In an embodiment of the invention, focal length of the fourth lens group of the above-mentioned lens module is f4, focal length of the fifth lens group is f5 and the lens module satisfies a following condition expression:

$$0.25 < \left[\frac{f4}{f5}\right] < 0.65$$

In an embodiment of the invention, the first lens of the first lens group of the above-mentioned lens module is located between the second lens of the first lens group and the second lens group, and the first lens and the second lens are joined to each other to form a cemented lens.

In an embodiment of the invention, Abbe number of the first lens of the above-mentioned lens module is V1, and Abbe number of the second lens is V2, wherein V1 and V2 satisfy a following condition expression:

$V1>70$ and $V2<35$

In an embodiment of the invention, the third lens group of the above-mentioned lens module includes a cemented lens and the cemented lens includes the fifth lens, in which Abbe number of the fifth lens is V3, and V3 satisfies a following condition expression:

$V3>70$

In an embodiment of the invention, the above-mentioned fourth lens group and the fifth lens group respectively include at least one aspheric lens.

In an embodiment of the invention, the above-mentioned first lens group further includes an eleventh lens with positive refractive-power located between the first lens of the first lens group and the second lens group.

In an embodiment of the invention, the above-mentioned second lens group further includes a twelfth lens with negative refractive-power located between the fourth lens and the first lens group.

In an embodiment of the invention, the fifth lens of the above-mentioned third lens group is located between the sixth lens of the third lens group and the second lens group.

In an embodiment of the invention, the above-mentioned third lens group further includes a thirteenth lens with negative refractive-power located between the fifth lens and the second lens group and the cemented lens of the above-mentioned third lens group is formed by the fifth lens, the sixth lens and the thirteenth lens.

In an embodiment of the invention, the above-mentioned third lens group further includes a fourteenth lens with positive refractive-power located between the thirteenth lens and the second lens group.

In an embodiment of the invention, the cemented lens of the above-mentioned third lens group is formed by the fifth lens and the sixth lens.

In an embodiment of the invention, the seventh lens of the above-mentioned fourth lens group is located between the eighth lens of the fourth lens group and the third lens group, and the seventh lens is the aspheric lens of the above-mentioned fourth lens group.

In an embodiment of the invention, the above-mentioned fourth lens group further includes a fifteenth lens with positive refractive-power located between the eighth lens and the fifth lens group.

In an embodiment of the invention, the ninth lens of the above-mentioned fifth lens group is located between the tenth lens of the fifth lens group and the fourth lens group, the ninth lens is the aspheric lens of the above-mentioned fifth lens group and the ninth lens and the tenth lens form a cemented lens.

In an embodiment of the invention, the above-mentioned lens module further includes an aperture stop located between the second lens group and the third lens group.

Based on the description above, in the lens module and the image apparatus of the invention, the five lens groups all include at least one positive lens and at least one negative lens, the refractive-powers of the five lens groups are sequentially positive, negative, positive, positive and positive. Moreover, each lens of the third lens group is a spherical lens. In this way, in addition to having high zoom magnification and high revolution, the lens module and the image apparatus of the invention can obtain good image-capturing effect under the different wavelength ranges of the object light-beam.

In order to make the aforementioned and other features and advantages of the invention comprehensible, several exemplary embodiments accompanied with figures are described in detail below.

BRIEF DESCRIPTION OF THE DRAWINGS

FIG. 3A is a modulation transfer function (MTF) plot when the lens module is at the wide-end and the object light-beam is visible light.

FIG. 3B is an MTF plot when the lens module is at the wide-end and the object light-beam is infrared light.

FIG. 3C is an MTF plot when the lens module is at the tele-end and the object light-beam is visible light.

FIG. 3D is an MTF plot when the lens module is at the tele-end and the object light-beam is infrared light.

FIG. 6A is a lateral chromatic aberration plot when the lens module is at the wide-end.

FIG. 6B is a lateral chromatic aberration plot when the lens module is at the tele-end.

FIG. 9A is an MTF plot when the lens module is at the wide-end and the object light-beam is visible light.

FIG. 9B is an MTF plot when the lens module is at the wide-end and the object light-beam is infrared light.

FIG. 9C is an MTF plot when the lens module is at the tele-end and the object light-beam is visible light.

FIG. 9D is an MTF plot when the lens module is at the tele-end and the object light-beam is infrared light.

FIGS. 12A and 12B are two lateral chromatic aberration plots when the lens module is at the wide-end and at the tele-end.

DESCRIPTION OF THE EMBODIMENTS

The above-mentioned or other relevant technical principles and the features and effects thereof are clearly depicted together with the accompanying drawings in the following depicted embodiments. Note that some of expression words hereinafter regarding direction or orientation, such as 'up', 'down', 'front', 'behind', 'left', 'right', and the like, are to describe, not to limit, the invention.

The First Embodiment

Figure 1A:
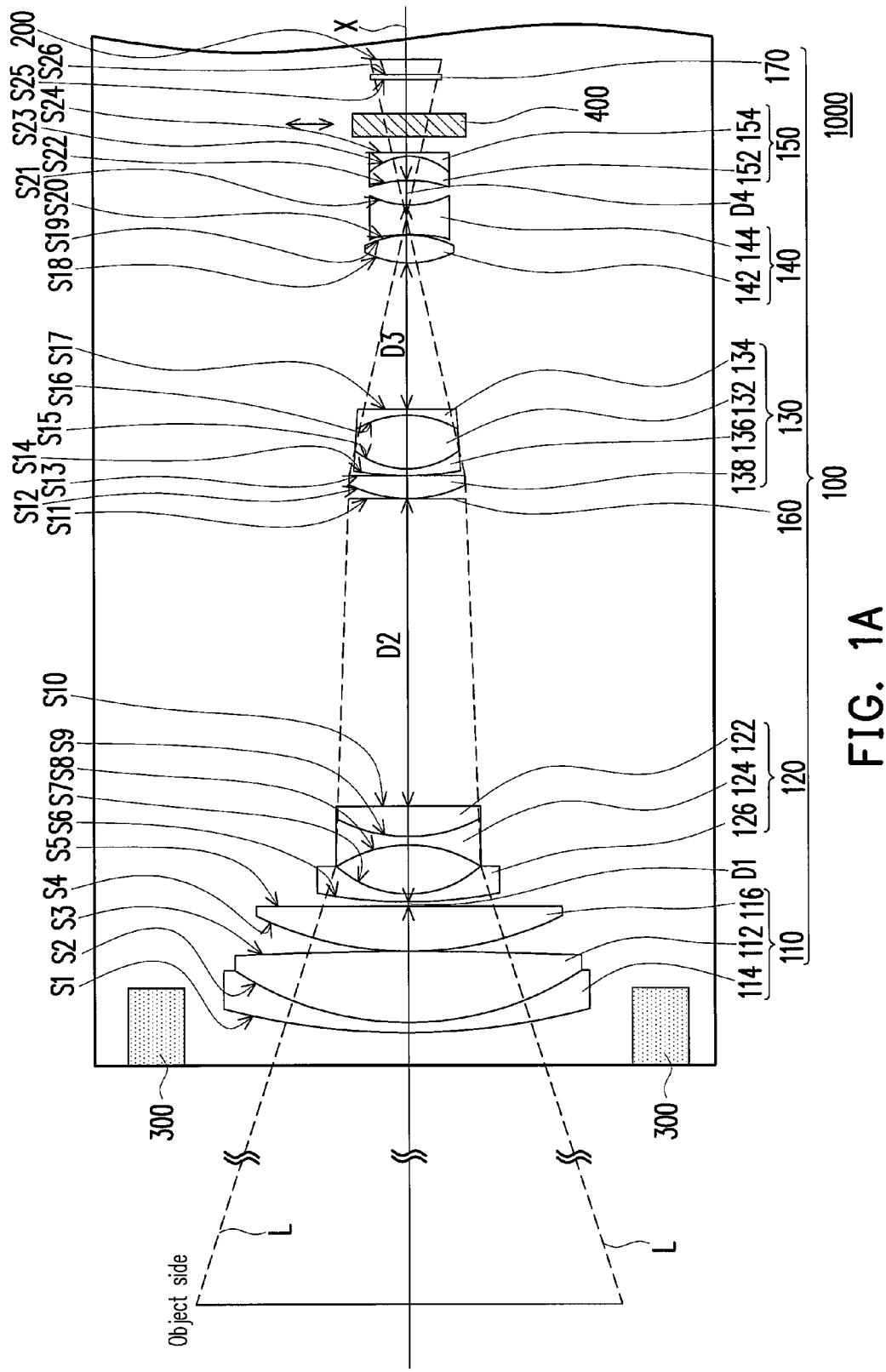
FIGS. 1A and 1B are two schematic optical structure diagrams of the image apparatus under different zoom magnifications according to the first embodiment of the invention.
Figure 1B:
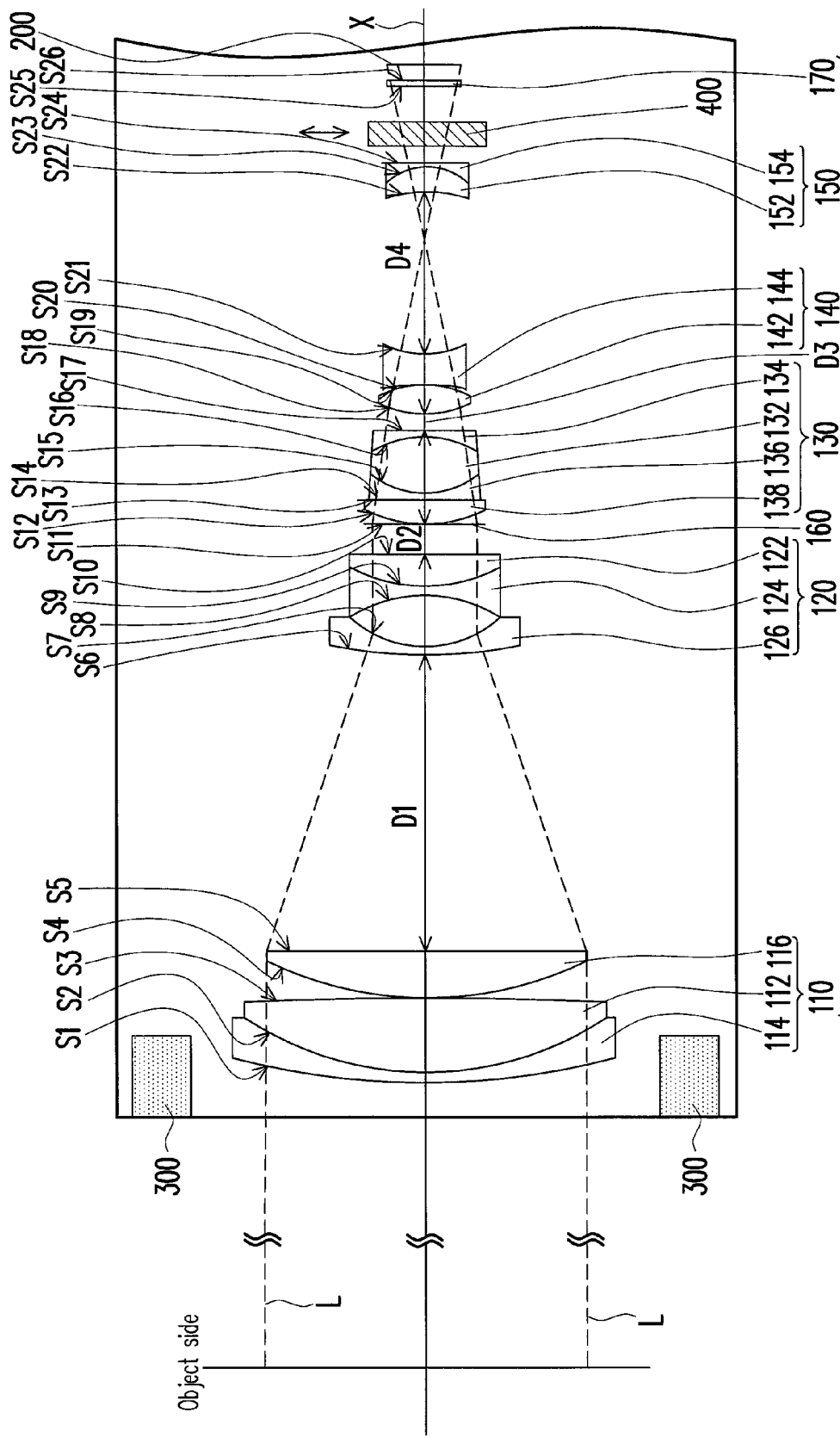

FIGS. 1A and 1B are two schematic optical structure diagrams of the image apparatus under different zoom magnifications according to the first embodiment of the invention, in which FIG. 1A illustrates the optical structure of the image apparatus at the wide-end and FIG. 1B illustrates the optical structure of the image apparatus at the tele-end. Referring to FIGS. 1A and 1B, an image apparatus 1000 of the embodiment is configured for capturing an object light-beam L from the object-side. The image apparatus 1000 of the embodiment includes a lens module 100 and a photosensitive component 200, and the lens module 100 and the photosensitive component 200 are located on the transmission path of the object light-beam L, and the lens module 100 is located between the photosensitive component 200 and the object-side. In the embodiment, the photosensitive component 200 is, for example, a charge coupled device (CCD), which the invention is not limited to. In other embodiments, the photosensitive component 200 can be other kinds of photosensitive component, for example, a complementary metal-oxide semiconductor device (CMOS device) or a traditional film.

The image apparatus 1000 of the embodiment further includes a light-emitting component 300 and a light-filtering component 400. The light-emitting component 300 is configured for emitting an illumination light-beam with first wavelength-range towards the object-side (not shown). The light-filtering component 400 is for blocking the light-beam with first wavelength-range, but allowing the light-beam with other wavelength-ranges to pass through. The image apparatus 1000 of the embodiment has 24-hours surveillance function through the light-emitting component 300 and the light-filtering component 400, referring to the examples in following.

In the embodiment, when the luminance of the object-side is greater than a predetermined value (for example, the luminance of the object-side is greater than the general luminance at night), the light-emitting component 300 is turned off and the light-filtering component 400 moves on the transmission path of the object light-beam L (for example, between the lens module 100 and the photosensitive component 200). Thereby, the object light-beam L from the object-side can pass through the light-filtering component 400, and the light-filtering component 400 filters out a partial light-beam with first wavelength-range in the object light-beam L so that the color shift problem unlikely occurs with the images captured by the photosensitive component 200. On the other hand, when the luminance of the object-side is less than a predetermined value (for example, the luminance of the object-side is less than the general luminance at day), the light-emitting component 300 is turned on to emit an illumination light-beam with first wavelength range towards the object at the object-side. Meanwhile, the light-filtering component 400 moves and leaves from the transmission path of the object light-beam L. In this way, the illumination light-beam with first wavelength range after being reflected by the object at the object-side is converted into the object light-beam L, and the object light-beam L with first wavelength range is able to pass through the lens module 100 to arrive at the photosensitive component 200. In other words, under the situation with low luminance at the object-side, the photosensitive component 200 is capable of capturing the image of the object at the object-side.

In the embodiment, the first wavelength-range of the illumination light-beam is different from the wavelength-range of the visible light, i.e., the first wavelength-range of the illumination light-beam is not from 400 nm to 700 nm. For example, the first wavelength-range of the illumination light-beam can be the same as the wavelength-range of infrared light, i.e., it is between 770 nm and 1 mm, which the invention is not limited to.

Figure 2A:
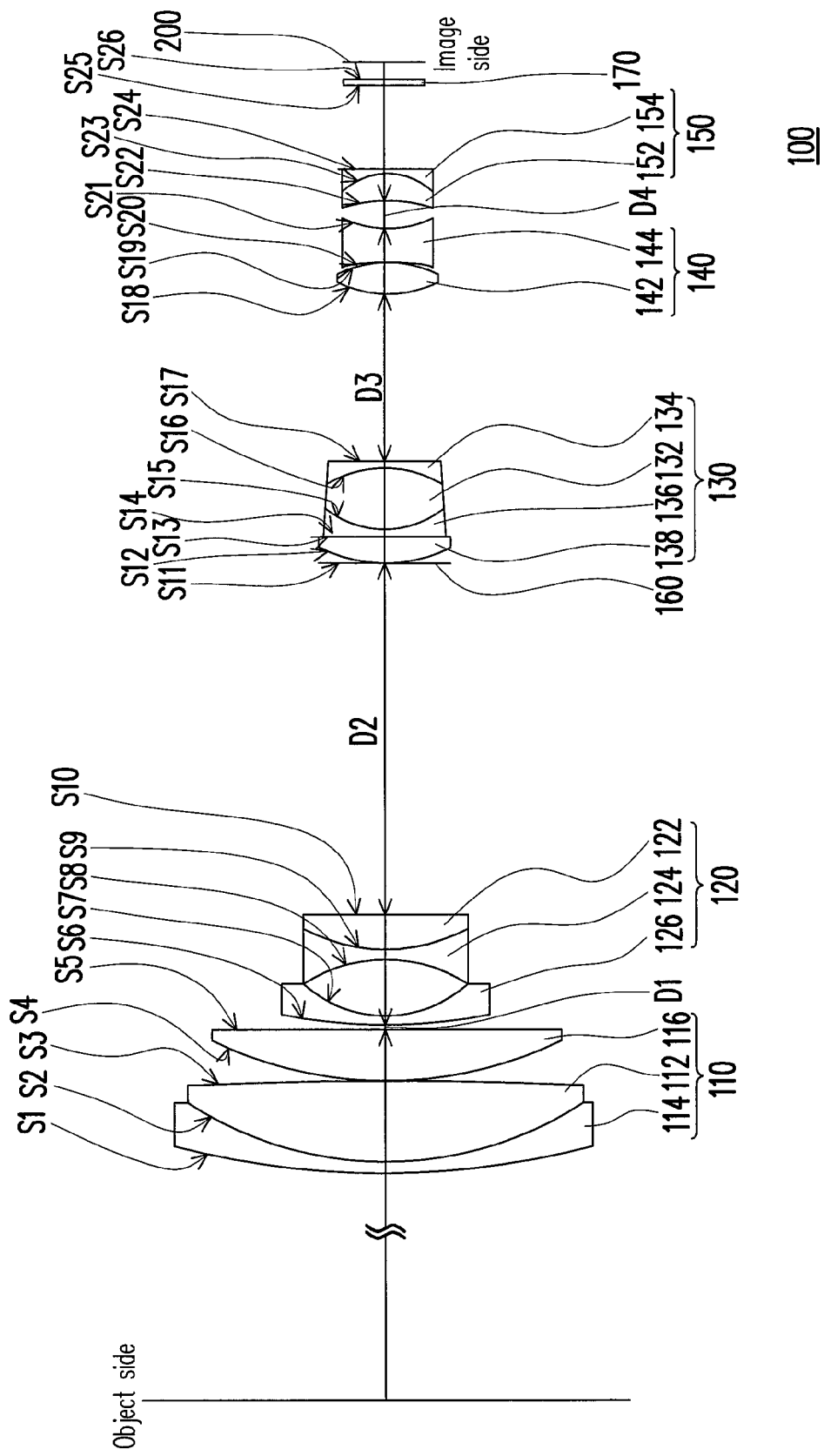
FIGS. 2A and 2B are two schematic optical structure diagrams respectively corresponding to the lens module of the image apparatus in FIGS. 1A and 1B.
Figure 2B:
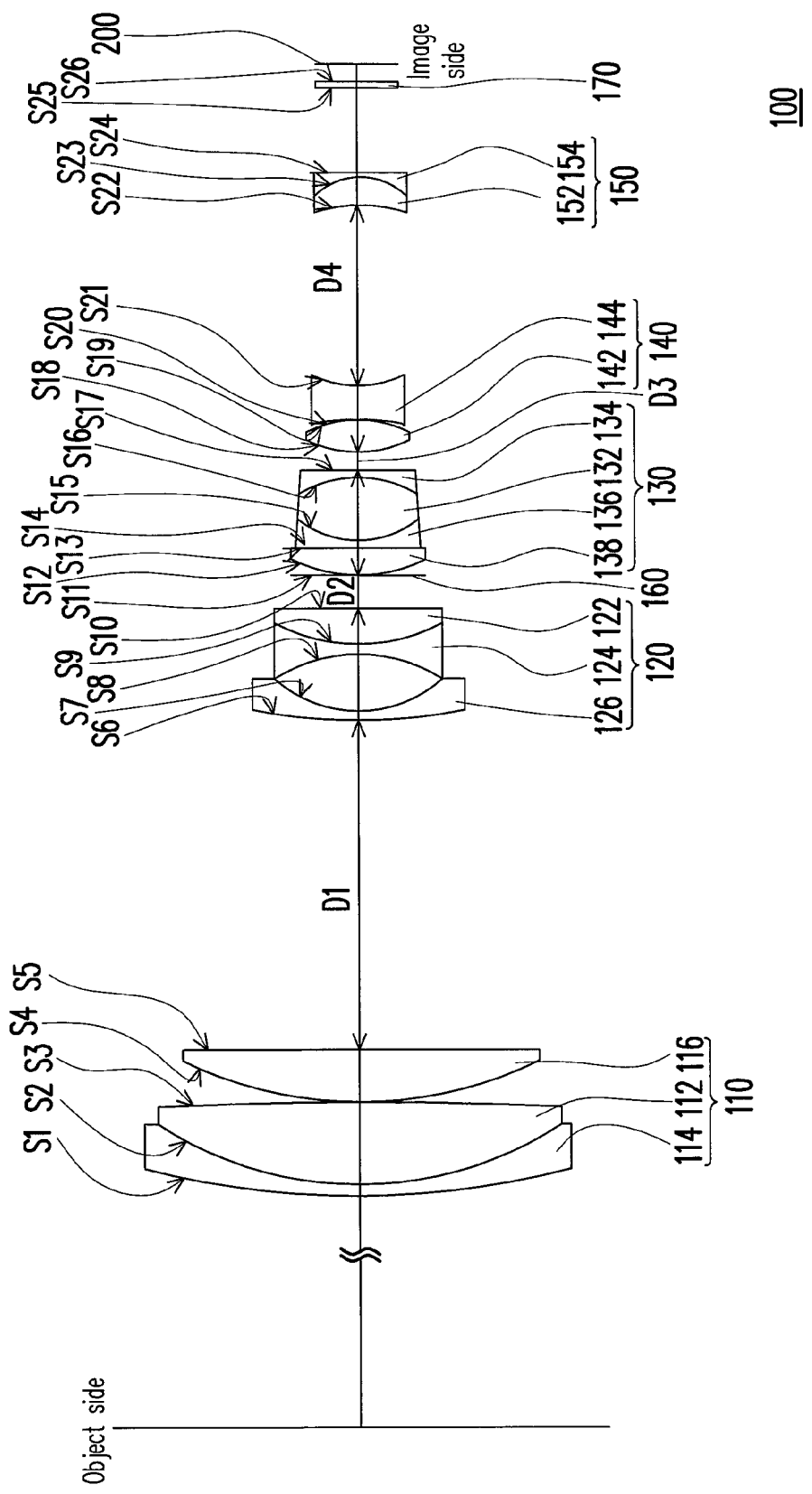

By employing the lens module 100 of the embodiment, the image apparatus 1000 in the embodiment can capture images with good quality for different wavelength-ranges of the object light-beam L. The structure of the lens module 100 in the embodiment is described in details in association with diagrams as following. FIGS. 2A and 2B are two schematic optical structure diagrams respectively corresponding to the lens module of the image apparatus in FIGS. 1A and 1B, in which FIG. 2A illustrates the optical structure of the image apparatus at the wide-end and FIG. 2B illustrates the optical structure of the image apparatus at the tele-end.

Referring to FIGS. 1A, 1B, 2A and 2B, the lens module 100 of the embodiment is disposed between the image-side and the object-side for capturing the object light-beam L from the object-side. In the image apparatus 1000, the image-side is corresponding to the photosensitive component 200. The lens module 100 includes five lens groups sequentially-arranged from the object-side to the image-side: a first lens group 110, a second lens group 120, a third lens group 130, a fourth lens group 140 and a fifth lens group 150. All of the five lens groups 110-150 are located on the transmission path of the object light-beam L, i.e., they are disposed on an optical-axis X of the lens module. All of the five lens groups 110-150 respectively include at least one lens with positive refractive-power and at least one lens with negative refractive-power. The first lens group 110, the third lens group 130 and the fifth lens group 150 are fixed groups and respectively fixed on the optical-axis X; the second lens group 120 and the fourth lens group 140 are removable groups and able to move along the optical-axis X, respectively.

The first lens group 110 of the embodiment has positive refractive-power and includes a first lens 112 with positive refractive-power and a second lens 114 with negative refractive-power. In the embodiment, the first lens 112 is located between the second lens 114 and the second lens group 120. The first lens 112 is a double-convex lens and the second lens 114 is a convex-concave lens with its concave surface facing the image-side. The first lens group 110 of the embodiment includes a cemented lens formed by the first lens 112 and the second lens 114 joined to the first lens 112. In addition, the first lens group 110 further includes an eleventh lens 116 located between the first lens 112 and the second lens group 120. The eleventh lens 116 has positive refractive-power and the eleventh lens 116 is a concave-convex lens with its concave surface facing the image-side.

The second lens group 120 of the embodiment has negative refractive-power and includes a third lens 122 with positive refractive-power and a fourth lens 124 with negative refractive-power. The third lens 122 is located between the third lens group 130 and a fourth lens 124. In the embodiment, the third lens 122 is joined to the fourth lens 124 to form a cemented lens. The third lens 122 is a flat-convex lens with its convex surface facing the object-side and the fourth lens 124 is a double-concave lens. In addition, the second lens group 120 of the embodiment further includes a twelfth lens 126 located between the fourth lens 124 and the first lens group 110. The twelfth lens 126 has negative refractive-power and is a convex-concave lens with its concave surface facing the image-side.

The third lens group 130 of the embodiment has positive refractive-power and includes a fifth lens 132 with positive refractive-power and a sixth lens 134 with negative refractive-power. The fifth lens 132 is located between the sixth lens 134 and the second lens group 120. The fifth lens is a double-convex lens and the sixth lens is a flat-concave lens with its concave surface facing the object-side. The third lens group 130 of the embodiment further includes a thirteenth lens 136 located between the fifth lens 132 and the second lens group 120. The thirteenth lens has negative refractive-power and is a convex-concave lens with its concave surface facing the image-side. In the embodiment, the fifth lens 132, the sixth lens 134 and the thirteenth lens 136 are formed a cemented lens. In addition, the third lens group 130 of the embodiment further includes a fourteenth lens 138 located between the thirteenth lens 136 and the second lens group 120. The fourteenth lens 138 has positive refractive-power and is a concave-convex lens with its concave surface facing the image-side.

It should be noted that the third lens group 130 of the embodiment does not include aspheric lens. In more details, the surface of any lens in the third lens group 130 is not satisfied a following aspherical expression:

$$Z(y) = \frac{cy^2}{1 + \sqrt{1 - (1+K)c^2y^2}} + Ay^4 + By^6 + Cy^8 + Dy^{10} + \ldots$$

In the above-mentioned expression, Z is sag in the optical-axis direction, c is reciprocal of radius of osculating sphere and K is conic coefficient, y is height of aspheric surface, i.e., the height from the lens center to the lens edge along a direction which is perpendicular to the optical-axis X, while A, B, C and D are aspheric coefficients. In the embodiment, any lens in the third lens group 130 is a spherical lens.

The fourth lens group 140 of the embodiment has positive refractive-power and includes a seventh lens 142 with positive refractive-power and an eighth lens 144 with negative refractive-power. The seventh lens 142 is located between the eighth lens 144 and the third lens group 130. The seventh lens 142 is a double-convex lens and the eighth lens 144 is a double-concave lens. It should be noted that in the embodiment, the fourth lens group 140 includes at least one aspheric lens. In more details, the seventh lens 142 is an aspheric lens. The aspheric lens is able to correct the light passing through the lens edge, so that the aberration generated by the lens module 100 can be effectively reduced by the aspheric lens in the fourth lens group 140, which further advances the image-capturing quality.

The fifth lens group 150 of the embodiment has positive refractive-power and includes a ninth lens 152 with positive refractive-power and a tenth lens 154 with negative refractive-power. The ninth lens 152 is located between the tenth lens 154 and the fourth lens group 140. The ninth lens 152 is a concave-convex lens with its concave surface facing the object-side and the tenth lens 154 is a convex-concave lens with its concave surface facing the object-side. It should be noted that in the embodiment, the fifth lens group 150 includes at least one aspheric lens. In more details, the ninth lens 152 is an aspheric lens. The aspheric lens is able to correct the light passing through the lens edge, so that the aberration generated by the lens module 100 can be effectively reduced by the aspheric lens in the fifth lens group 150, which further advances the image quality captured by the image apparatus 1000. In addition, the ninth lens 152 is joined to the tenth lens 154 to form a cemented lens and the cemented lens is an aspheric lens.

The lens module 100 of the embodiment further includes an aperture stop (A.S.) 160. The aperture stop 160 is able to filter out a part of light far away from the optical-axis X to further advance the optical characteristic of the lens module 100 of the embodiment. In the embodiment, the aperture stop 160 is located between the second lens group 120 and the third lens group 130, which the invention is not limited to. In other embodiments, the aperture stop 160 is located at other appropriate positions. In addition, the lens module 100 of the embodiment further includes a transparent protection cover 170. The transparent protection cover 170 is disposed between the fifth lens group 150 and the photosensitive component 200 and the transparent protection cover 170 is configured for protecting the photosensitive component 200.

When the distance D1 between the second lens group 120 and the first lens group 110 gets longer, as shown by FIGS. 1A, 1B, 2A and 2B, i.e., the second lens group 120 approaches the third lens group 130 along the optical-axis X, the image apparatus 1000 and the lens module 100 shift from the wide-end to the tele-end. The focal length of the second lens group 120 is f2, the focal length of the lens module 100 at the wide-end is fW and the focal length of the lens module 100 at the tele-end is fT. In the embodiment, f2, fW and fT satisfy a following condition expression (1):

$$0.4 < ((f2/\sqrt{(fW \times fT)})) < 0.6 \tag{1}$$

The focal length of the fourth lens group is f4 and the focal length of the fifth lens group is f5. In the embodiment, f4 and f5 satisfy a following condition expression (2):

$$0.25 < \left[\frac{f4}{f5}\right] < 0.65 \tag{2}$$

The Abbe number of the first lens 112 of the embodiment is V1 and the Abbe number of the second lens 114 of the embodiment is V2, wherein V1 and V2 satisfy a following condition expression (3):

$$V1 > 70 \text{ and } V2 < 35 \tag{3}$$

In the embodiment, the third lens group 130 includes a cemented lens formed by the fifth lens 132, the sixth lens 134 and the thirteenth lens 136, wherein the Abbe number of the fifth lens 132 of the embodiment is V3 and V3 satisfies the following condition expression (4):

$$V3 > 70 \tag{4}$$

When f2, fW and fT satisfy the aforementioned condition expression (1), f4 and f5 satisfy the aforementioned condition expression (2) and V1 and V2 satisfy the aforementioned condition expression (3), or V3 satisfies the aforementioned condition expression (4), the image apparatus 1000 can capture images with good quality under the situation with different wavelength-ranges of the object light-beam L.

In following, the design data of the lens module 100 in an embodiment is given. It should be noted that the given data in following Table 1 does not limit the invention. In fact, any people skilled in the art can refer to the invention to make appropriate modifications on the given parameters or settings, which still fall in the scope of the invention.

In Table 1, curvature radius (mm) means the curvature radius of a corresponding surface, interval (mm) means the straight distance between two adjacent surfaces on the optical-axis X. For example, the interval of the surface S1 means the distance between the surface S1 and the surface S2. The thickness, the refractive index and the Abbe number corresponding to each lens and each optical component in the note column are listed in the same line of Table 1. S1 is a surface of the second lens 114 facing the object-side and S2 is a surface of the second lens 114 joined to the first lens 112. S3 is a surface of the first lens 112 facing the image-side, and S4 and S5 are two surfaces of the eleventh lens 116 respectively facing the object-side and the image-side. The above-mentioned three lenses together form the first lens group 110.

S6 is a surface of the twelfth lens 126 facing the object-side and the S7 is a surface of the twelfth lens 126 facing the fourth lens 124. S8 is a surface of the fourth lens 124 facing the surface of the twelfth lens 126. S9 is a surface of the fourth lens 124 joined to the third lens 122. S10 is a surface of the third lens 122 facing the image-side. The above-mentioned three lenses together form the second lens group 120.

S11 is the surface of the aperture stop 160. S12 and S13 are two surfaces of the fourteenth lens 138 respectively facing the object-side and the image-side, in which S13 is a surface joined to the thirteen lens 136. S14 is a surface of the thirteen lens 136 joined to the fifth lens 132. S15 is a surface of the fifth lens 132 joined to the sixth lens 134. S17 is a surface of the sixth lens 134 facing the image-side. The above-mentioned four lenses together form the third lens group 130.

S18 is a surface of the seventh lens 142 facing the object-side, S19 is a surface of the seventh lens 146 facing the eighth lens 144, S20 is a surface of the eighth lens 144 facing the seventh lens 142, and S21 is a surface of the eighth lens 144 facing the image-side. The above-mentioned three lenses together form the fourth lens group 140.

S22 is a surface of the ninth lens 152 facing the object-side, S23 is a surface of the ninth lens 152 joined to the tenth lens 154, S24 is a surface of the tenth lens 154 facing the image-side, and S25 and S26 are two surfaces of the transparent protection-cap 170. The above-mentioned two lenses together form the fifth lens group 150. All the curvature radiuses and intervals of all the surfaces are listed in Table 1, but the details thereof are omitted to describe.

TABLE 1

| Surface | curvature radius (mm) | interval (mm) | refractive index | Abbe number | Note |
|---|---|---|---|---|---|
| S1 | 69.69 | 0.9 | 1.85 | 23.8 | second lens |
| S2 | 31.49 | 5.77 | 1.5 | 81.6 | first lens |
| S3 | −259.38 | 0.13 | | | |
| S4 | 33.42 | 3.46 | 1.82 | 46.6 | eleventh lens |
| S5 | 191.51 | D1(variable) | | | |
| S6 | 56.37 | 0.65 | 1.8 | 46.6 | twelfth lens |

TABLE 1-continued

| Surface | curvature radius (mm) | interval (mm) | refractive index | Abbe number | Note |
|---|---|---|---|---|---|
| S7 | 10.22 | 4.16 | | | |
| S8 | −13.734 | 0.65 | 1.77 | 49.6 | fourth lens |
| S9 | 13.257 | 2.69 | 1.92 | 20.9 | third lens |
| S10 | infinite | D2(variable) | | | |
| S11 | infinite | 0.1 | | | aperture stop |
| S12 | 14.075 | 1.86 | 1.92 | 20.9 | fourteenth lens |
| S13 | 164.88 | 0.12 | | | |
| S14 | 24.72 | 0.5 | 1.85 | 23.8 | thirteenth lens |
| S15 | 7.34 | 4.38 | 1.5 | 81.6 | fifth lens |
| S16 | −9.66 | 0.5 | 1.65 | 39.7 | sixth lens |
| S17 | infinite | D3(variable) | | | |
| S18 | 12.31 | 1.92 | 1.77 | 49.6 | seventh lens |
| S19 | −20.18 | 0.2 | | | |
| S20 | −98.72 | 2.71 | 1.72 | 34.7 | eighth lens |
| S21 | 12.17 | D4(variable) | | | |
| S22 | −40 | 2.17 | 1.77 | 49.6 | ninth lens |
| S23 | −5.922 | 0.55 | 1.65 | 33.8 | tenth lens |
| S24 | −25.1 | 6.23 | | | |
| S25 | infinite | 0.45 | 1.52 | 64.2 | transparent protection cover |
| S26 | infinite | 1 | | | |

It should be noted that the above-mentioned seventh lens 142 and ninth lens 152 are aspheric lens. In more details, the surface S18, surface S19, surface S22 are aspherical surfaces and are expressed by a following aspherical expression:

$$Z(y) = \frac{cy^2}{1 + \sqrt{1 - (1+K)c^2 y^2}} + Ay^4 + By^6 + Cy^8 + Dy^{10} + \ldots$$

In the above-mentioned formula, Z is sag in the optical-axis direction, c is reciprocal of radius of osculating sphere, i.e., the reciprocal of curvature radius at the place close to the optical-axis X and K is conic coefficient, y is height of aspheric surface, i.e., the height from the lens center to the lens edge, while A, B, C and D are aspheric coefficients. Following Table 2 lists the parameters of surfaces S18, S19 and S22.

TABLE 2

| Surface | K | A | B | C | D |
|---|---|---|---|---|---|
| S18 | 0 | −6.65E−005 | 7.8599195e−006 | −5.34E−007 | 2.12E−008 |
| S19 | −5.57 | 2.89E−005 | 8.13E−006 | −5.93E−007 | 2.38E−008 |
| S22 | 0 | 0 | 7.90E−006 | −8.62E−007 | 2.48E−008 |

Following Table 3 lists some of important parameters D1, D2, D3 and D4 of the lens module 100 at the wide-end and at the tele-end, in which D1 is the variable distance between the first lens group 110 and the second lens group 120, D2 is the variable distance between the second lens group 120 and the third lens group 130, D3 is the variable distance between the third lens group 130 and the fourth lens group 140 and D4 is the variable distance between the fourth lens group 140 and the fifth lens group 150. In the embodiment, D1, D2, D3 and D4 are adjustable. For example, when D1=0.55 mm, D2=25.93 mm, D3=12.56 mm and D4=1.66 mm, the lens module 100 is at the wide-end, the focal length of the lens module 100 at the wide-end can be 5.4 mm and the F-number thereof is, for example, 1.6; when D1=24.58 mm, D2=1.9 mm, D3=5.15 mm and D4=9.07 mm, the lens module 100 is at the tele-end, the focal length of the lens module 100 at the tele-end can be 51.4 mm and the F-number thereof is, for example, 2.5.

TABLE 3

|  | D1 | D2 | D3 | D4 |
| --- | --- | --- | --- | --- |
| wide-end | 0.55 | 25.93 | 12.56 | 1.66 |
| tele-end | 24.58 | 1.9 | 5.15 | 9.07 |

FIGS. 3A-3D are imaging optical simulation data plots corresponding to the image apparatus of FIGS. 1A-2B. Referring to FIG. 3A, which is a modulation transfer function (MTF) plot when the lens module 100 is at the wide-end and the object light-beam L is visible light, in which the abscissa is focal point deflection and the ordinate is modulus of the optical transfer function (modulus of the OTF). Referring to FIG. 3B, which is an MTF plot when the lens module 100 is at the wide-end and the object light-beam L is infrared light. Referring to FIG. 3C, which is an MTF plot when the lens module 100 is at the tele-end and the object light-beam L is visible light. Referring to FIG. 3D, which is an MTF plot when the lens module 100 is at the tele-end and the object light-beam L is infrared light.

Figure 4A:
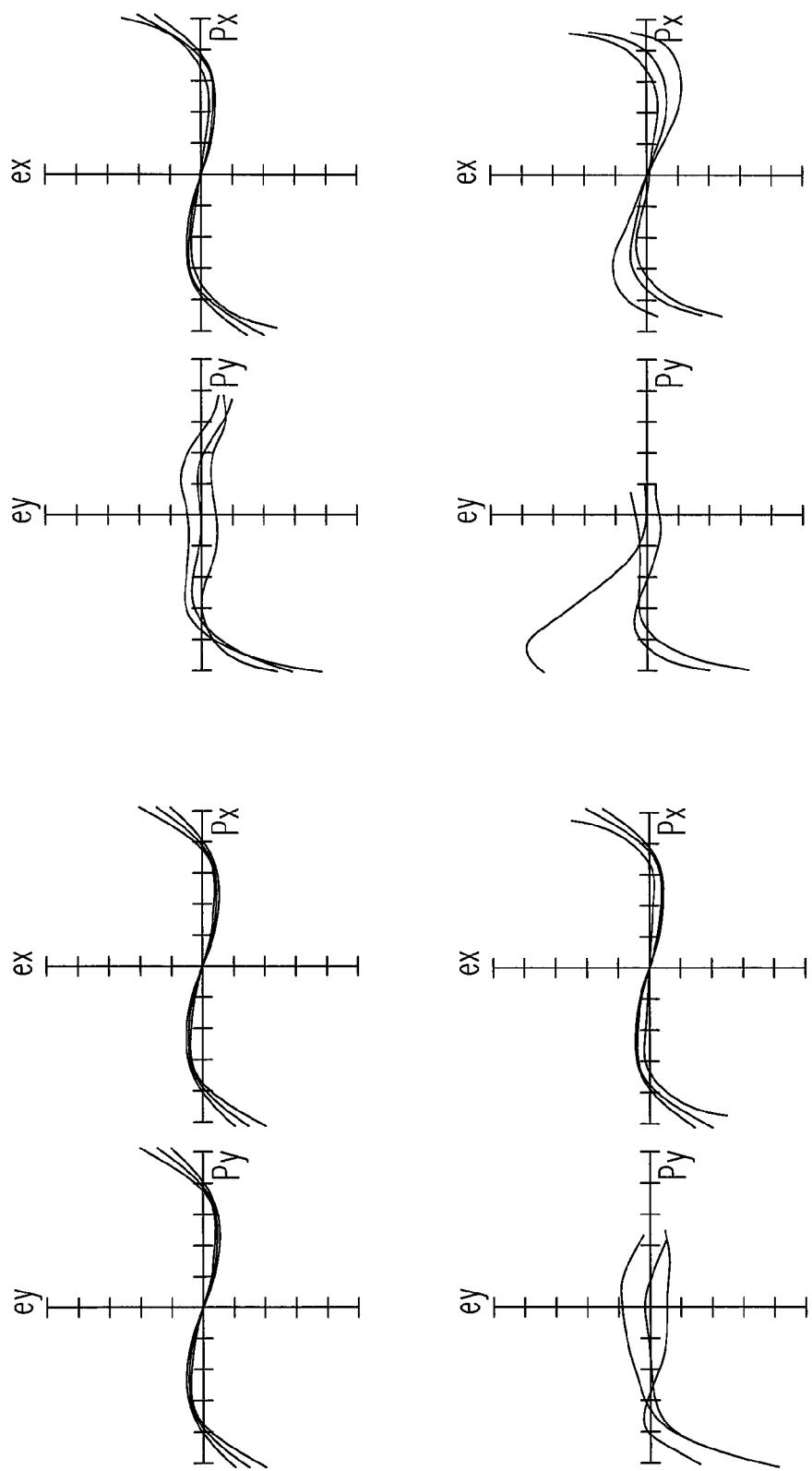
FIG. 4A is a ray-fan plot when the lens module is at the wide-end and the object light-beam is visible light.
Figure 4B:
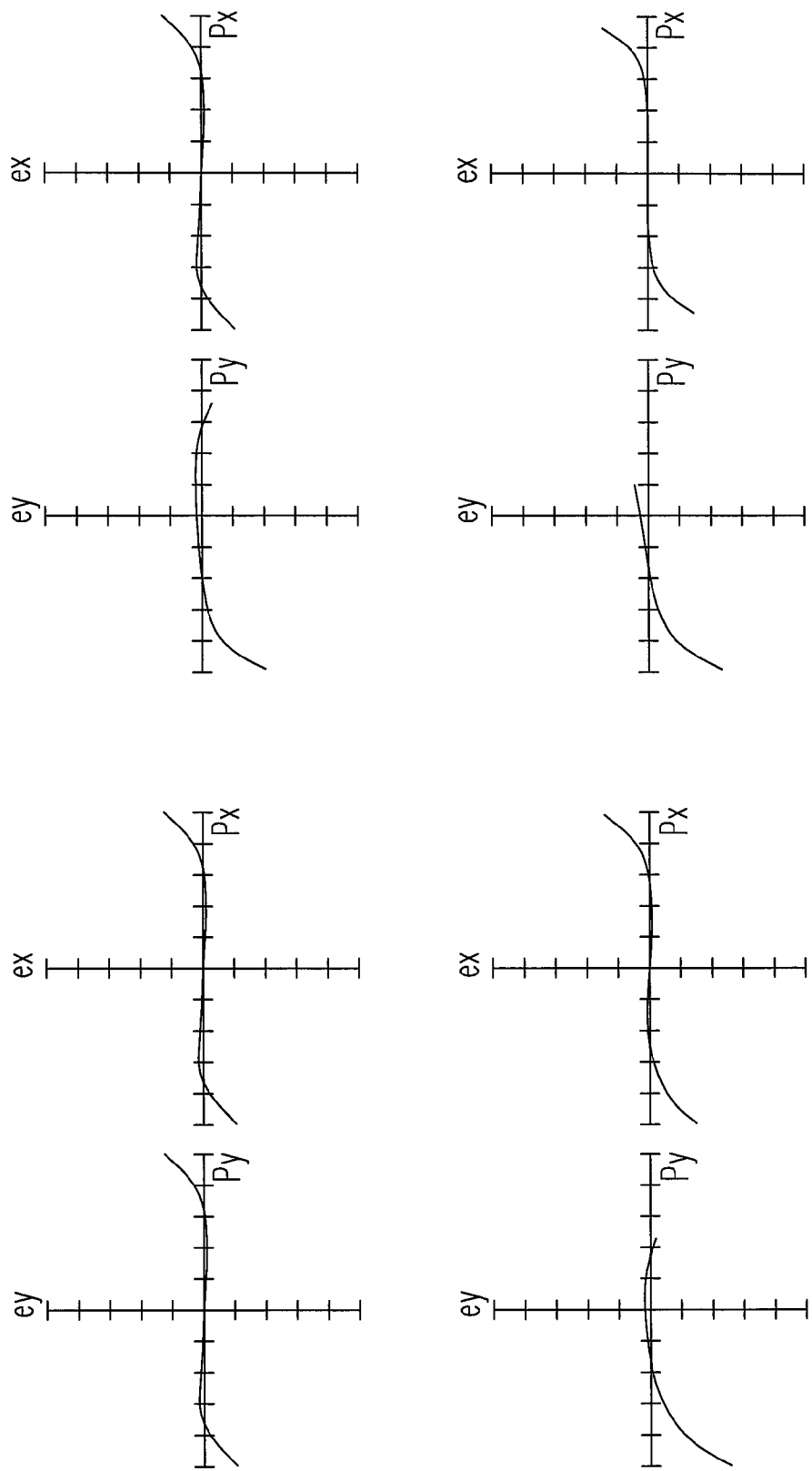
FIG. 4B is a ray-fan plot when the lens module is at the wide-end and the object light-beam is infrared light.
Figure 4C:
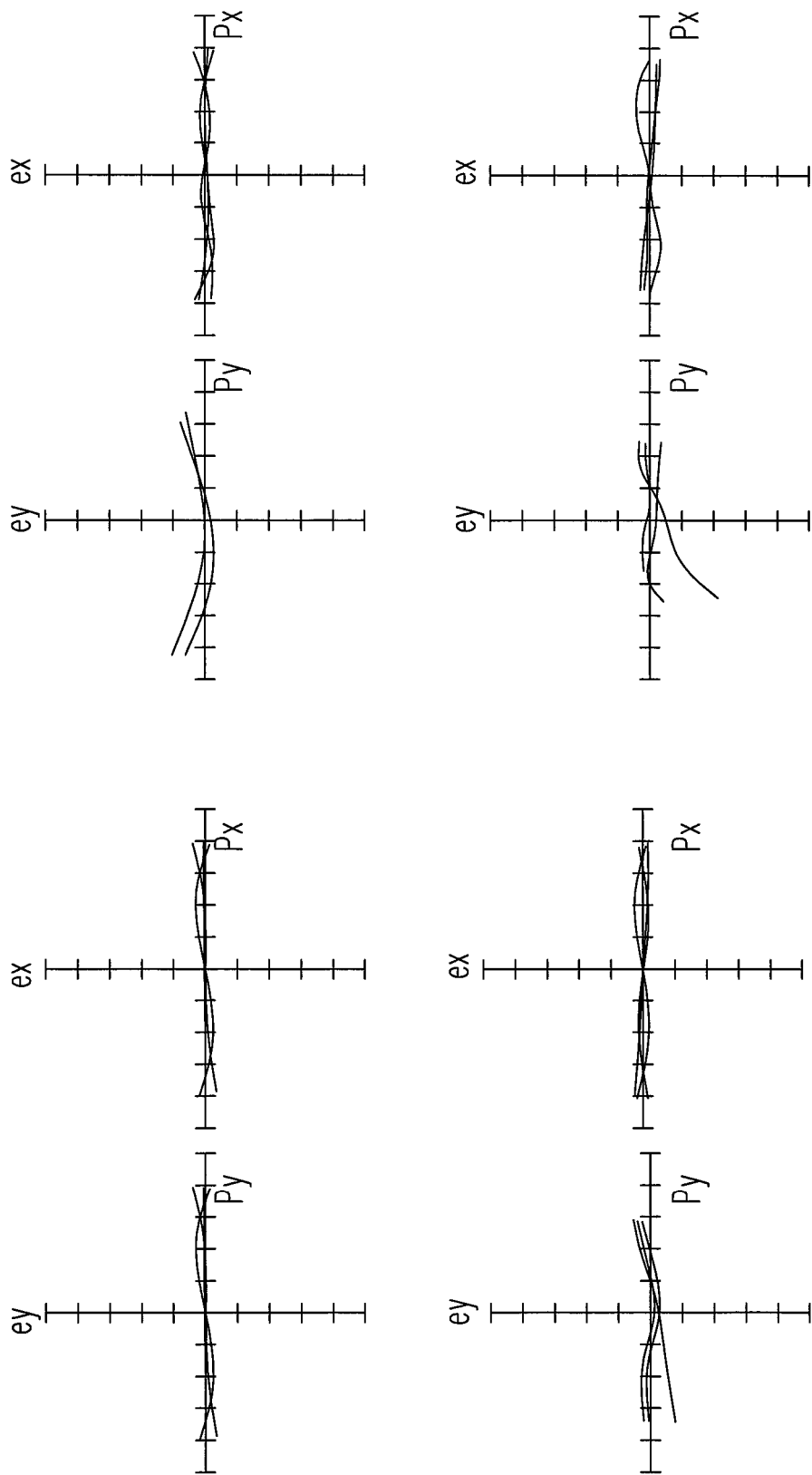
FIG. 4C is a ray-fan plot when the lens module is at the tele-end and the object light-beam is visible light.
Figure 4D:
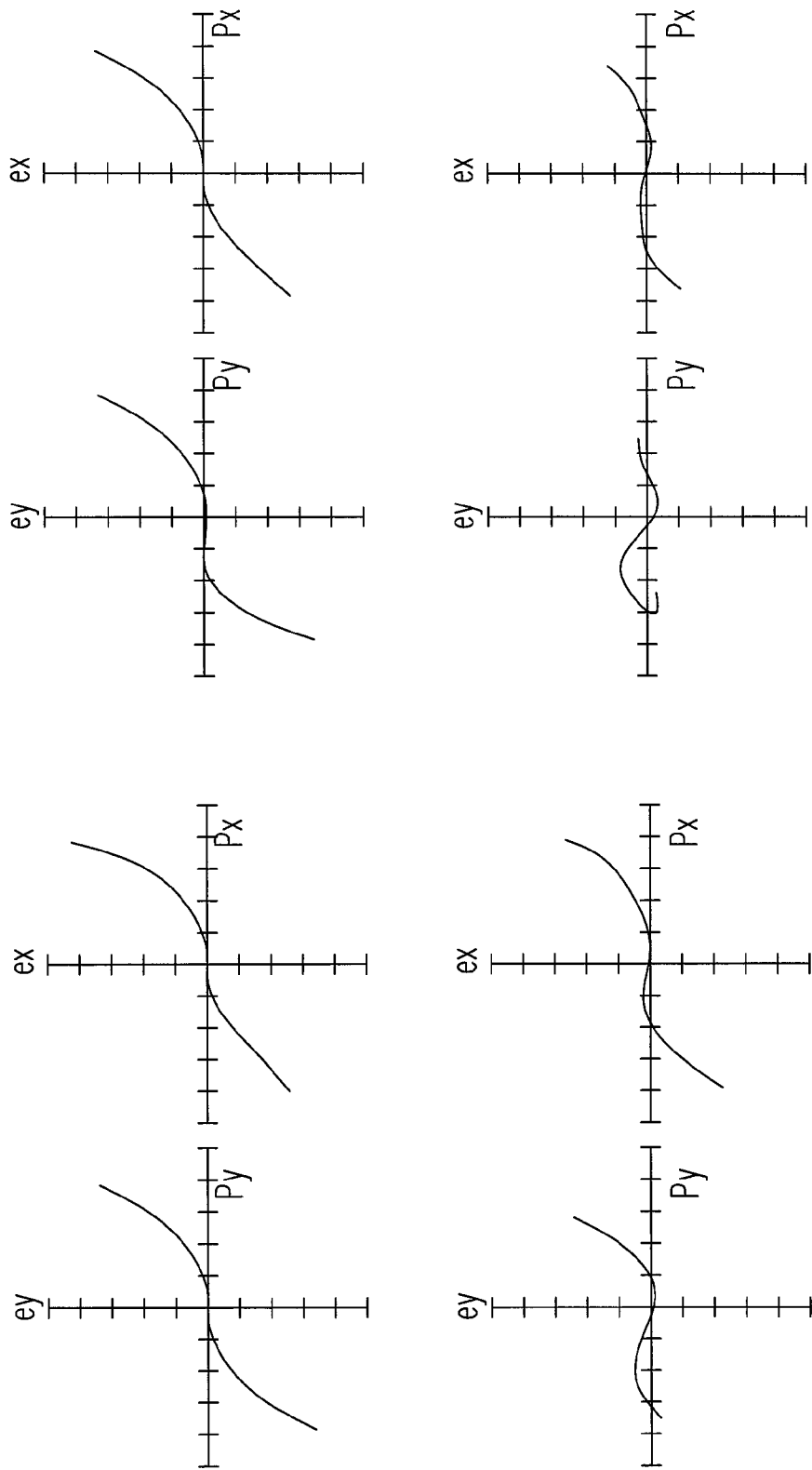
FIG. 4D is a ray-fan plot when the lens module is at the tele-end and the object light-beam is infrared light.

FIGS. 4A-4D are another group of imaging optical simulation data plots corresponding to the image apparatus of FIGS. 1A-2B. Referring to FIG. 4A, which is a ray-fan plot when the lens module 100 is at the wide-end and the object light-beam L is visible light. Referring to FIG. 4B, which is a ray-fan plot when the lens module 100 is at the wide-end and the object light-beam L is infrared light. Referring to FIG. 4C, which is a ray-fan plot when the lens module 100 is at the tele-end and the object light-beam L is visible light. Referring to FIG. 4D, which is a ray-fan plot when the lens module 100 is at the tele-end and the object light-beam L is infrared light.

Figure 5A:
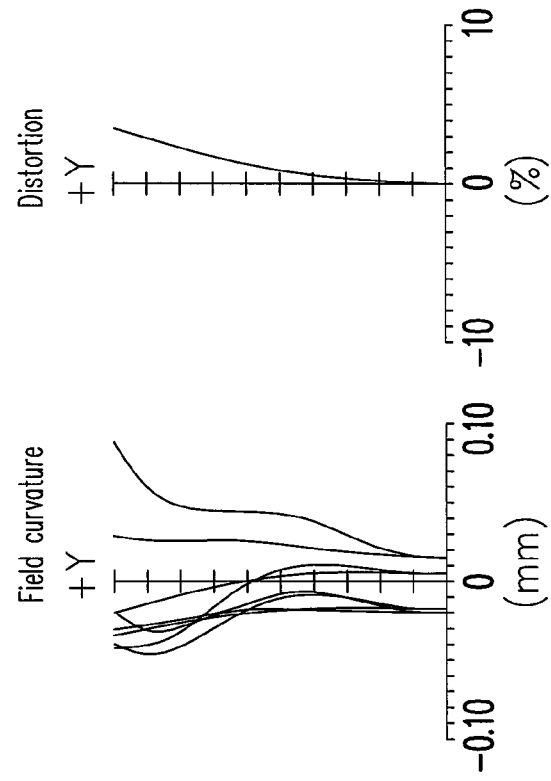
FIG. 5A is a plot of field curvature and distortion when the lens module is at the wide-end.
Figure 5B:
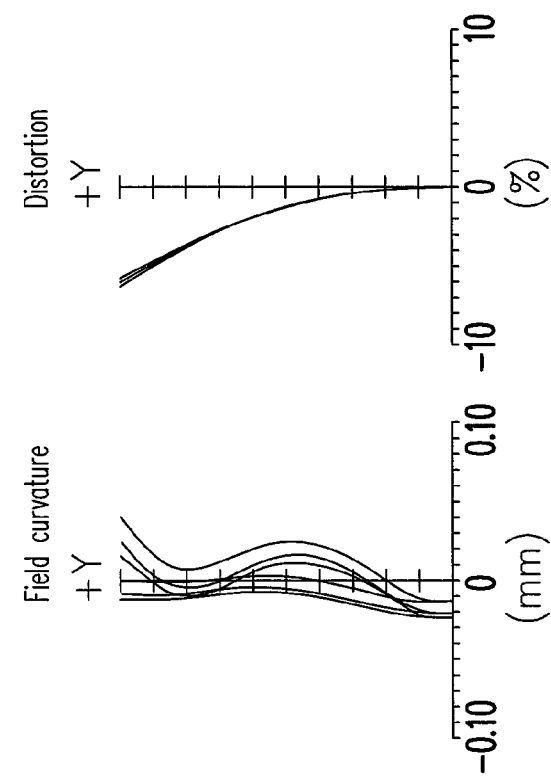
FIG. 5B is a plot of field curvature and distortion when the lens module is at the tele-end.

FIGS. 5A-5B are yet another group of imaging optical simulation data plots corresponding to the image apparatus of FIGS. 1A-2B. In FIG. 5A, a plot of field curvature (left) and a plot of distortion (right) are corresponding to the lens module 100 at the wide-end. In FIG. 5B, a plot of field curvature (left) and a plot of distortion (right) are corresponding to the lens module 100 at the tele-end. FIG. 6A and FIG. 6B are respectively a lateral chromatic aberration plot corresponding to the lens module 100 at the wide-end and the tele-end. It can be seen in FIGS. 3A-6B, all the data in the plots are within the standard, it indicates the image apparatus 1000 of the embodiment is advantageous in not only high zoom magnification and high revolution, but also good imaging effect under the situations of the object light-beam L with different wavelength ranges.

The Second Embodiment

Figure 7A:
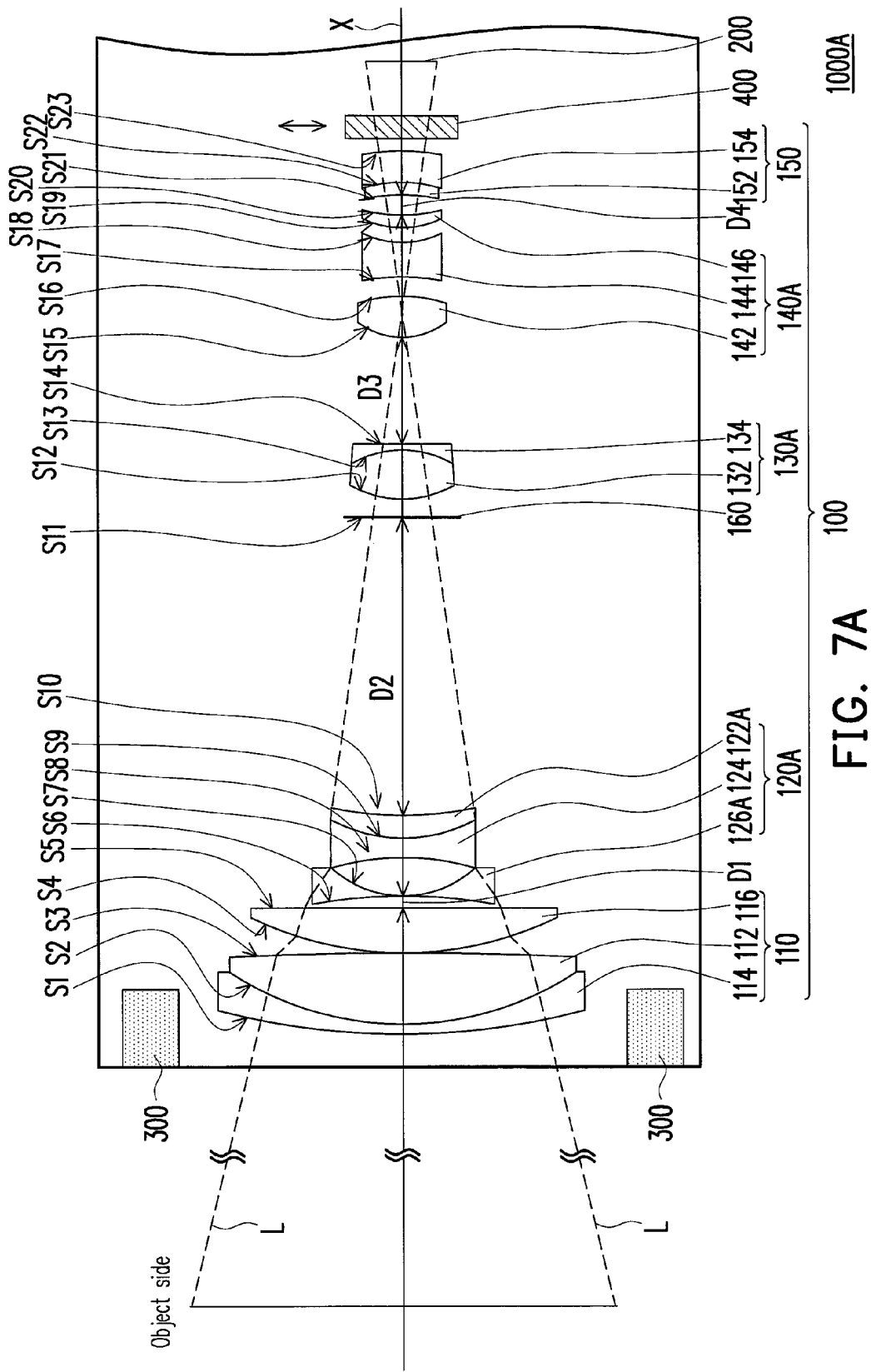
FIGS. 7A and 7B are two schematic optical structure diagrams of the image apparatus under different zoom magnifications according to the second embodiment of the invention.
Figure 7B:
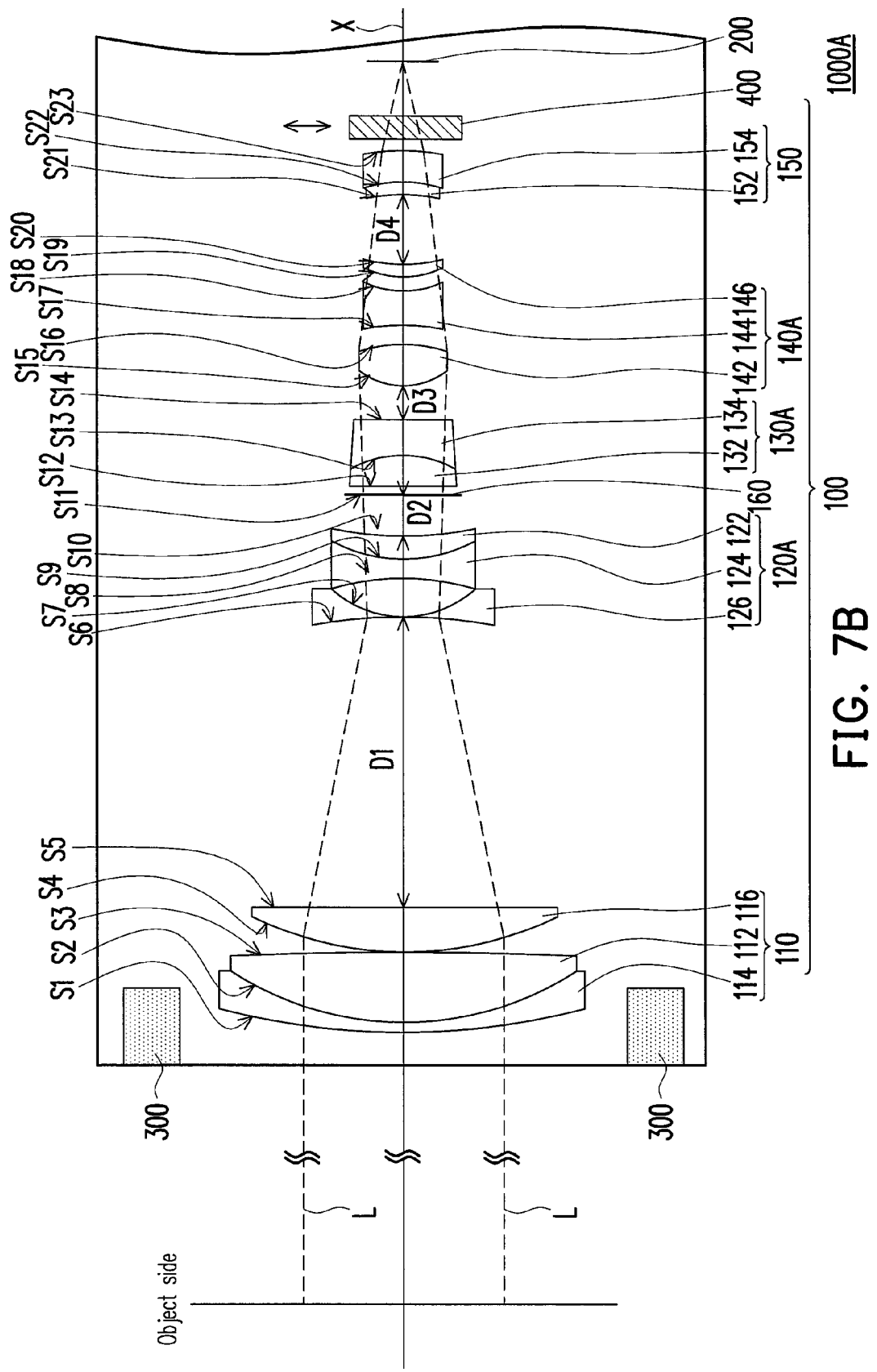

FIGS. 7A and 7B are two schematic optical structure diagrams of the image apparatus under different zoom magnifications according to the second embodiment of the invention. In particular, FIG. 7A illustrates the optical structure of the image apparatus at the wide-end and FIG. 7B illustrates the optical structure of the image apparatus at the tele-end. Referring to FIGS. 7A and 7B, the image apparatus 1000A of the embodiment is similar to the image apparatus 1000 of the first embodiment and the same components herein are notated with the same marks. The difference of the image apparatus 1000A of the embodiment from the image apparatus 1000 of the first embodiment rests in that the lens module 100A herein is somehow different from the lens module 100 in the first embodiment. In more details, the second lens group 120A, the third lens group 130A and the fourth lens group 140A are respectively from the second lens group 120, the third lens group 130 and the fourth lens group 140 in the first embodiment. The differences are explained in following, but the same portion is omitted to describe.

Figure 8A:
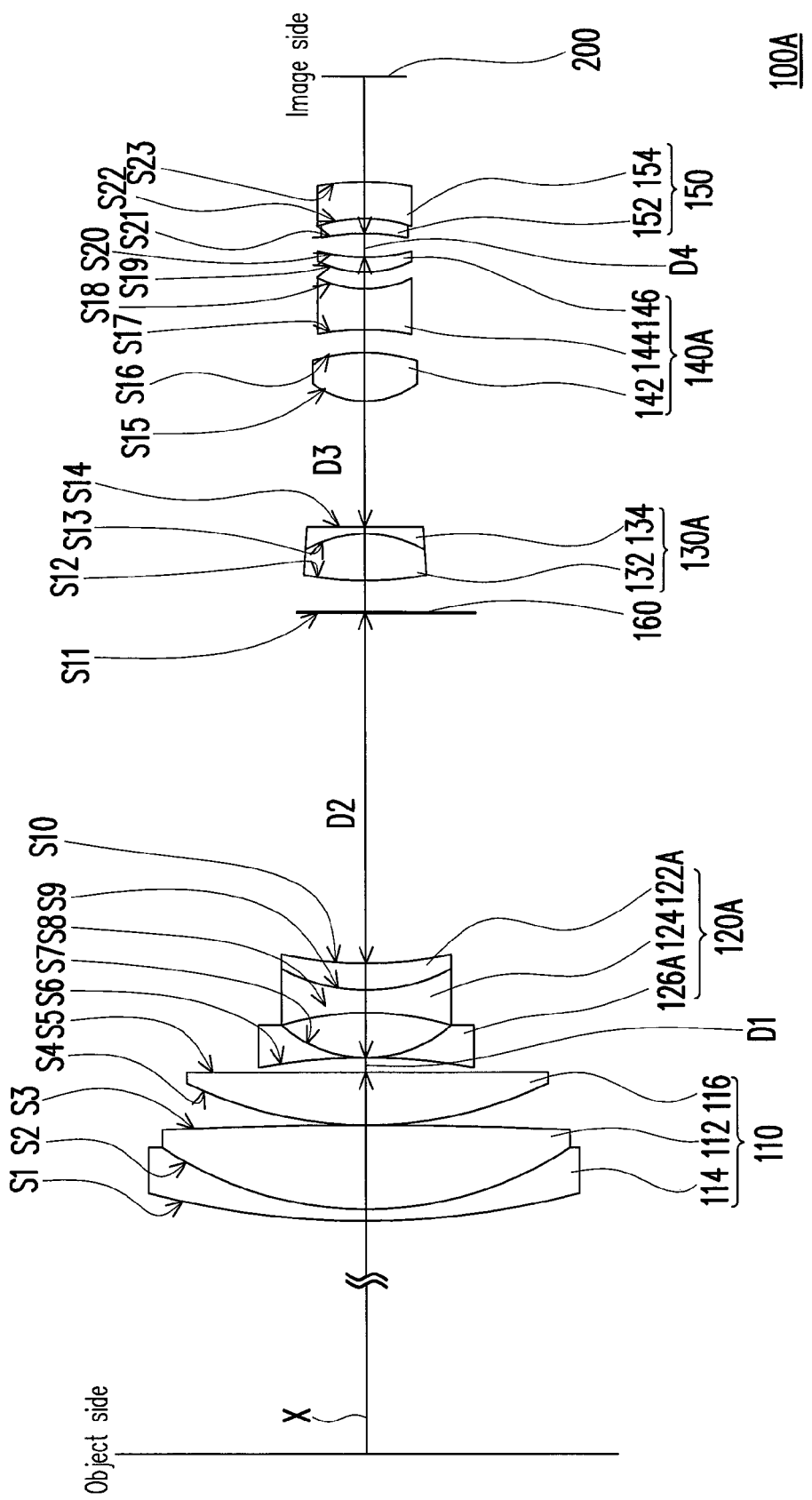
FIGS. 8A and 8B are two schematic optical structure diagrams respectively corresponding to the lens module of the image apparatus in FIGS. 7A and 7B.
Figure 8B:
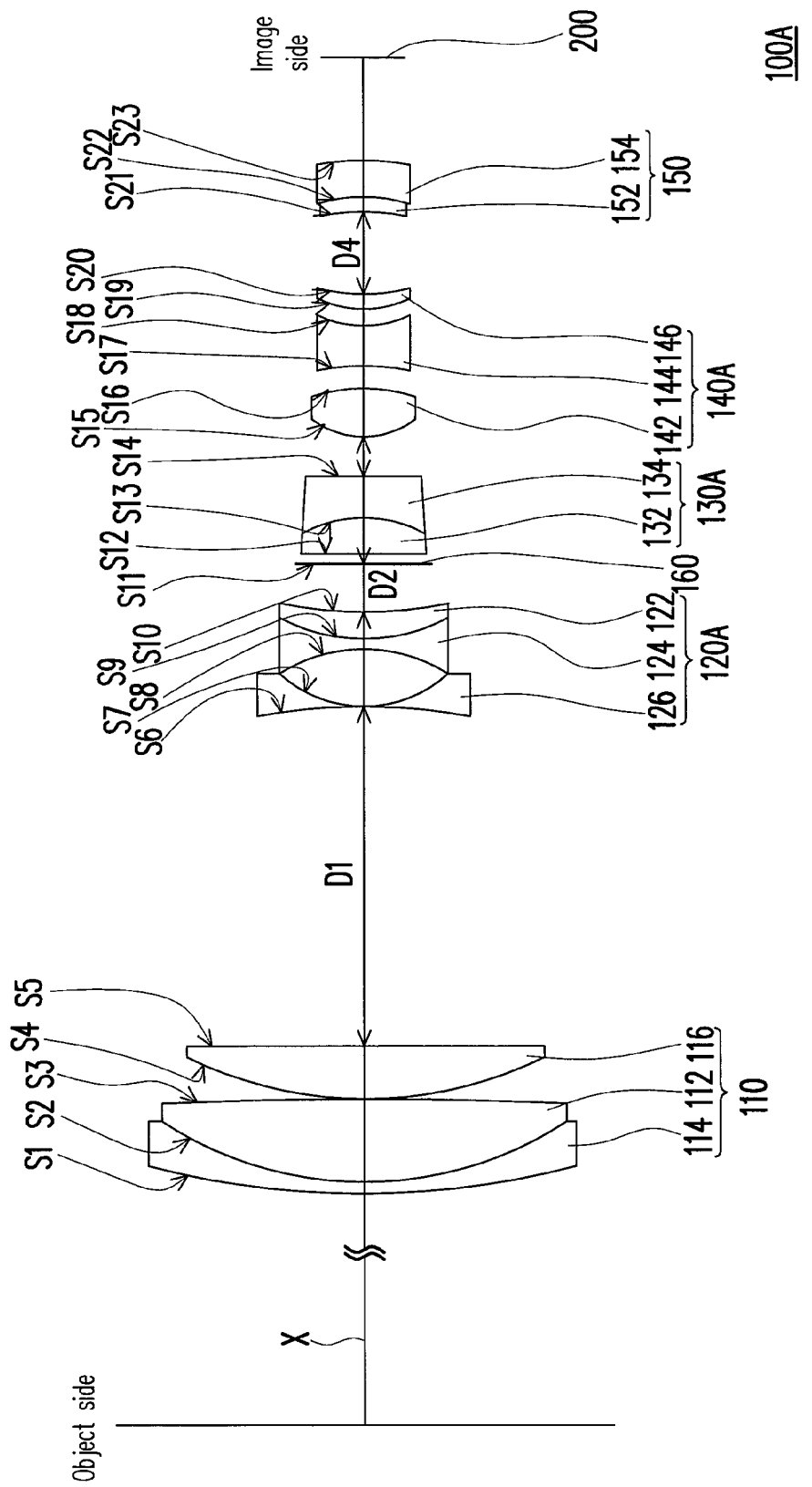

FIGS. 8A and 8B are two schematic optical structure diagrams respectively corresponding to the lens module of the image apparatus in FIGS. 7A and 7B, in which FIG. 8A illustrates the optical structure of the lens module at the wide-end and FIG. 8B illustrates the optical structure of the lens module at the tele-end. Referring to FIGS. 7A, 7B, 8A and 8B, there is difference between the second lens group 120A in the embodiment and the second lens group 120 in the first embodiment. In detail, the third and twelfth lenses 122A and 126A in this embodiment are different from the third and twelfth lenses 122 and 126 in the first embodiment, respectively. In the second embodiment, the third and twelfth lenses 122A and 126A are respectively a concave-convex lens with its concave surface facing the image-side and a double-concave lens.

The third lens group 130A of the embodiment is also different from the third lens group 130 in the first embodiment. In the embodiment, the third lens group 130A does not include the thirteenth lens 136 and the fourteenth lens 138 in the first embodiment, but the cemented lens herein is formed by the fifth lens 132 and the sixth lens 134 joined to each other.

The fourth lens group 140A of the embodiment is also different from the fourth lens group 140 in the first embodiment. In the embodiment, the fourth lens group 140A further includes a fifteenth lens 146 located between the eighth lens 144 and the fifth lens group 150. In the embodiment, the fifteenth lens 146 has positive refractive-power and is a concave-convex lens with its concave surface facing the image-side.

In following, the design data of the lens module 100A in an embodiment is given. It should be noted that the given data in following Table 4 does not limit the invention. In fact, any people skilled in the art can refer to the invention to make appropriate modifications on the given parameters or settings, which still fall in the scope of the invention.

In Table 4, curvature radius (mm) means the curvature radius of a corresponding surface, interval (mm) means the straight distance between two adjacent surfaces on the optical-axis X. For example, the interval of the surface S1 means the distance between the surface S1 and the surface S2. The thickness, the refractive index and the Abbe number corresponding to each lens and each optical component in the note column are listed in the same line of Table 4. S1 is a surface of the second lens 114 facing the object-side and S2 is a surface of the second lens 114 joined to the first lens 112. S3 is a surface of the first lens 112 facing the image-side, and S4 and S5 are two surfaces of the eleventh lens 116 respectively facing the object-side and the image-side. The above-mentioned three lenses together form the first lens group 110.

S6 is a surface of the twelfth lens 126A facing the object-side and the S7 is a surface of the twelfth lens 126A facing the fourth lens 124. S8 is a surface of the fourth lens 124 facing the surface of the twelfth lens 126A. S9 is a surface of the fourth lens 124 joined to the third lens 122A. S10 is a surface of the third lens 122A facing the image-side. The above-mentioned three lenses together form the second lens group 120A.

S11 is the surface of the aperture stop 160. S12 and S13 are two surfaces of the fifth lens 132 respectively facing the object-side and the image-side, in which S13 is a surface joined to the sixth lens 134. S14 is a surface of the sixth lens 134 facing the image-side. The above-mentioned two lenses together form the third lens group 130A.

S15 and S16 are two surfaces of the seventh lens 142 respectively facing the object-side and the image-side. S17 and S18 are two surfaces of the eighth lens 144 respectively facing the object-side and the image-side. S19 and S20 are two surfaces of the fifteenth lens 146 respectively facing the object-side and the image-side. The above-mentioned three lenses together form the fourth lens group 140A.

S21 is a surface of the ninth lens 152 facing the object-side, S22 is a surface of the ninth lens 152 joined to the tenth lens 154, S23 is a surface of the tenth lens 154 facing the image-side. The above-mentioned two lenses together form the fifth lens group 150. All the curvature radiuses and intervals of all the surfaces are listed in Table 4, but the details thereof are omitted to describe.

TABLE 4

| surface | curvature radius (mm) | interval (mm) | refractive index | Abbe number | Note |
|---|---|---|---|---|---|
| S1 | 72.61 | 0.7 | 1.85 | 23.77 | second lens |
| S2 | 36.68 | 5.9 | 1.5 | 81.6 | first lens |
| S3 | −160.09 | 0.1 | | | |
| S4 | 32.32 | 3.86 | 1.69 | 54.82 | eleventh lens |
| S5 | 144.54 | D1 | | | |
| S6 | −60.24 | 0.7 | 1.83 | 37.16 | twelfth lens |
| S7 | 10.42 | 3.33 | | | |
| S8 | −24.2 | 0.7 | 1.49 | 70.2 | fourth lens |
| S9 | 11.21 | 2.61 | 1.92 | 20.9 | third lens |
| S10 | 31.94 | D2 | | | |
| S11 | infinite | 2.12 | | | aperture stop |
| S12 | 26.33 | 3.32 | 1.5 | 81.61 | fifth lens |
| S13 | −7.66 | 0.7 | 1.56 | 60.67 | sixth lens |
| S14 | −52.42 | D3 | | | |
| S15 | 9.77 | 4.55 | 1.58 | 59.2 | seventh lens |
| S16 | −15.35 | 0.61 | | | |
| S17 | −115.81 | 1.93 | 1.65 | 33.79 | eighth lens |
| S18 | 7.24 | 1.11 | | | |
| S19 | 10.23 | 1.65 | 1.7 | 55.53 | fifteenth lens |
| S20 | 22.44 | D4 | | | |
| S21 | −57.95 | 2.04 | 1.69 | 53 | ninth lens |
| S22 | −7.75 | 2.52 | 1.85 | 23.78 | tenth lens |
| S23 | −16.38 | 7.5 | | | |

It should be noted that the above-mentioned seventh lens 142 and ninth lens 152 are aspheric lens. In more details, the surface S15, surface S16, surface S21 are aspheric surfaces and are expressed by the following aspherical expression:

$$Z(y) = \frac{cy^2}{1 + \sqrt{1 - (1+K)c^2 y^2}} + Ay^4 + By^6 + Cy^8 + Dy^{10} + \ldots$$

In the above-mentioned expression, Z is sag in the optical-axis direction, c is reciprocal of radius of osculating sphere, i.e., the reciprocal of curvature radius at the place close to the optical-axis X and K is conic coefficient, y is height of aspheric surface, i.e., the height from the lens center to the lens edge, while A, B, C and D are aspheric coefficients. Following Table 5 lists the parameters of surfaces S15, S16 and S21.

TABLE 5

| Surface | K | A | B | C | D |
|---|---|---|---|---|---|
| S15 | 0 | −9.28E−005 | −1.10E−007 | −3.24E−008 | 3.05E−010 |
| S16 | 0 | 0 | −3.92E−007 | −5.94E−008 | 1.29E−009 |
| S21 | 0 | 0 | −3.92E−007 | −5.94E−008 | 1.29E−009 |

Following Table 6 lists some of important parameters D1, D2, D3 and D4 of the lens module 100A at the wide-end and at the tele-end, in which D1 is the variable distance between the first lens group 110 and the second lens group 120A, D2 is the variable distance between the second lens group 120A and the third lens group 130A, D3 is the variable distance between the third lens group 130A and the fourth lens group 140A and D5 is the variable distance between the fourth lens group 140A and the fifth lens group 150. In the embodiment, D1, D2, D3 and D4 are adjustable. For example, when D1=11.54 mm, D2=25.79 mm, D3=7.49 mm and D4=1.23 mm, the lens module 100A is at the wide-end, the focal length of the lens module 100A at the wide-end can be 5.3 mm and the F-number thereof is, for example, 1.7; when D1=27.04 mm, D2=0.28 mm, D3=3.54 mm and D4=5.18 mm, the lens module 100A is at the tele-end, the focal length of the lens module 100A at the tele-end can be 50.5 mm and the F-number thereof is, for example, 2.1.

TABLE 6

| | D1 | D2 | D3 | D4 |
|---|---|---|---|---|
| wide-end | 11.54 | 25.79 | 7.49 | 1.23 |
| tele-end | 27.04 | 0.28 | 3.54 | 5.18 |

FIGS. 9A-9D are imaging optical simulation data plots corresponding to the image apparatus of FIGS. 7A-8B. Referring to FIG. 9A, which is an MTF plot when the lens module 100A is at the wide-end and the object light-beam L is visible light, in which the abscissa is focal point deflection and the ordinate is modulus of the OTF. Referring to FIG. 9B, which is an MTF plot when the lens module 100A is at the wide-end and the object light-beam L is infrared light. Referring to FIG. 9C, which is an MTF plot when the lens module 100A is at the tele-end and the object light-beam L is visible light. Referring to FIG. 9D, which is an MTF plot when the lens module 100A is at the tele-end and the object light-beam L is infrared light.

Figure 10A:
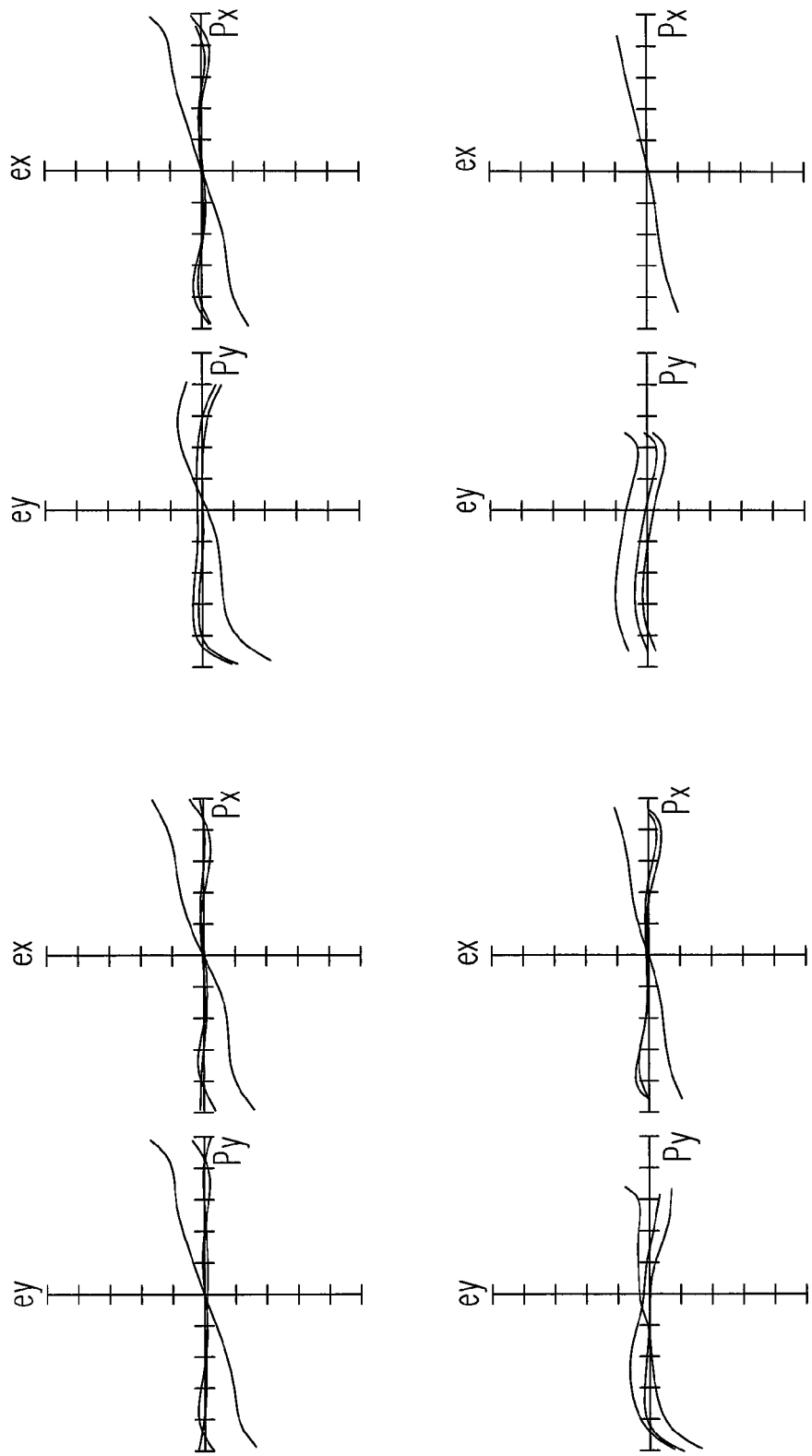
FIG. 10A is a ray-fan plot when the lens module is at the wide-end and the object light-beam is visible light.
Figure 10B:
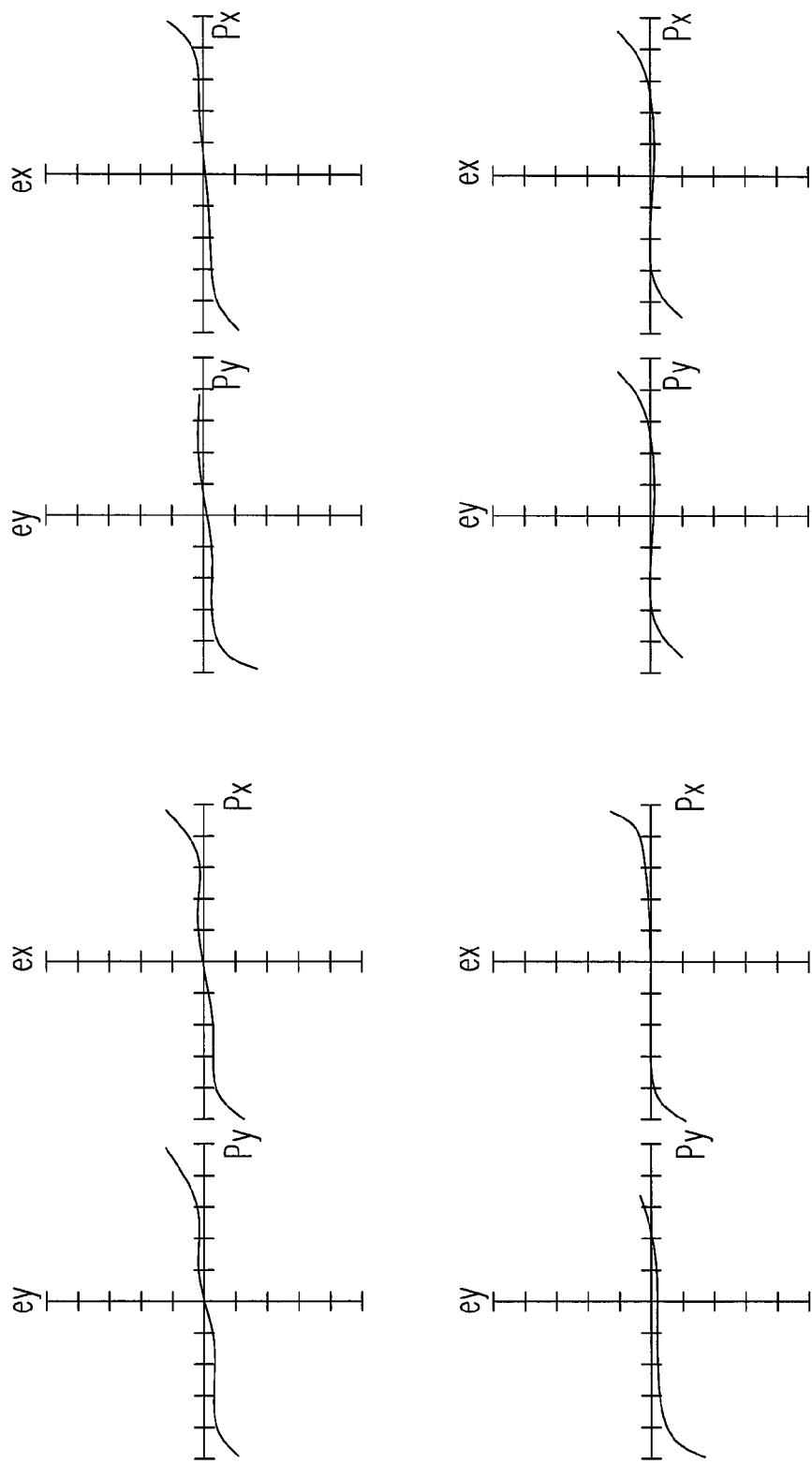
FIG. 10B is a ray-fan plot when the lens module is at the wide-end and the object light-beam is infrared light.
Figure 10C:
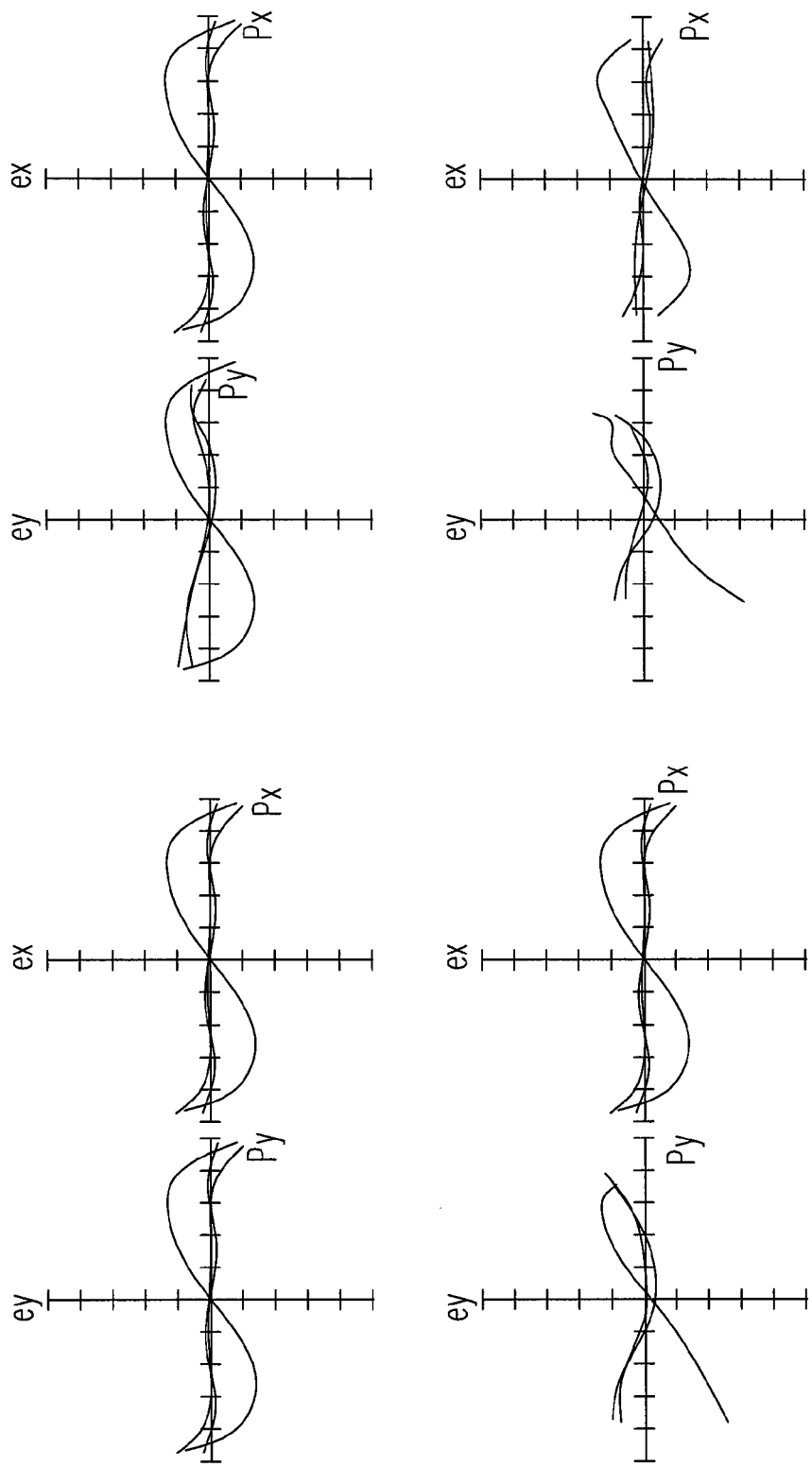
FIG. 10C is a ray-fan plot when the lens module is at the tele-end and the object light-beam is visible light.
Figure 10D:
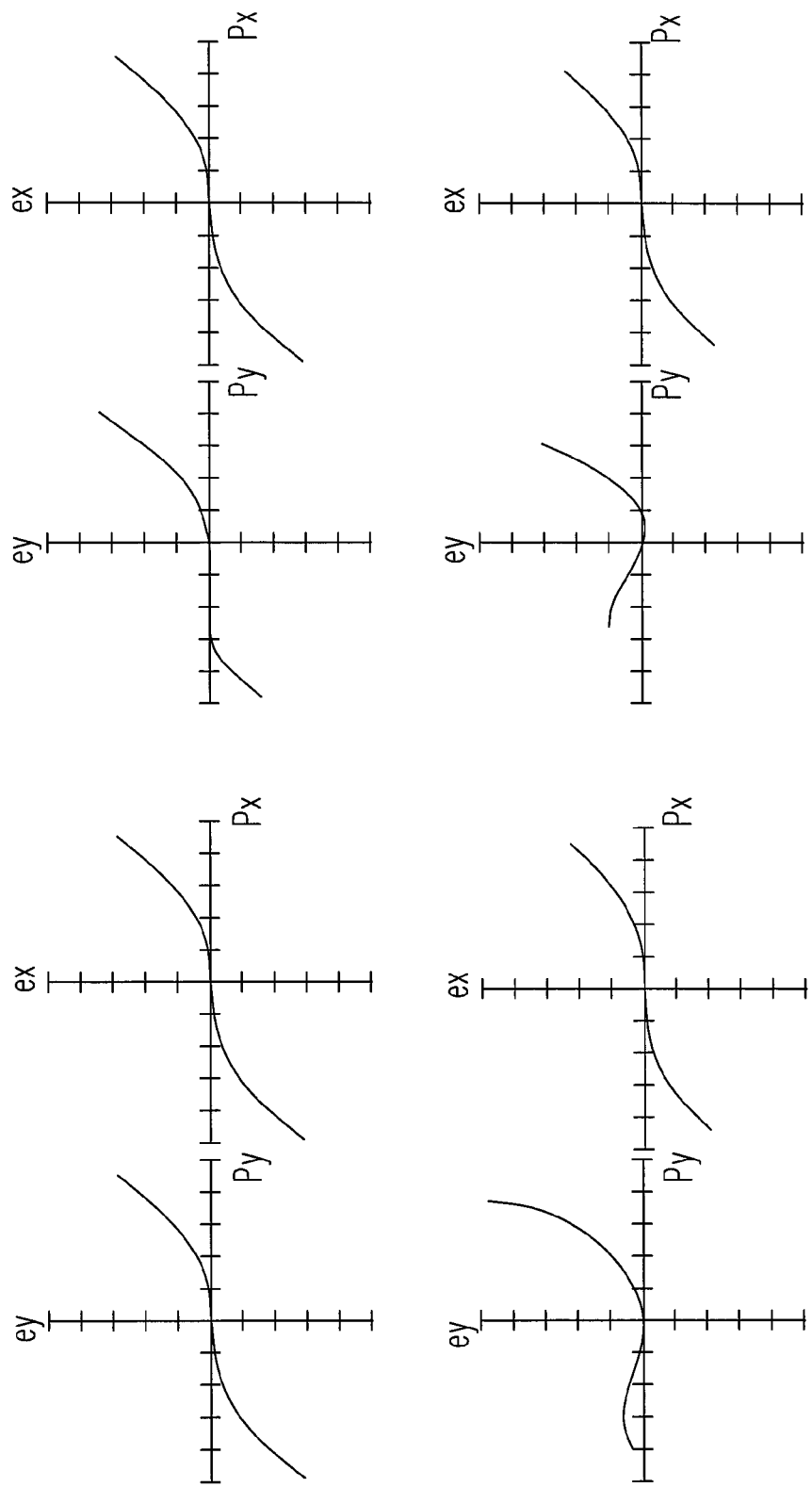
FIG. 10D is a ray-fan plot when the lens module is at the tele-end and the object light-beam is infrared light.

FIGS. 10A-10D are another group of imaging optical simulation data plots corresponding to the image apparatus of FIGS. 7A-8B. Referring to FIG. 10A, which is a ray-fan plot when the lens module 100A is at the wide-end and the object light-beam L is visible light. Referring to FIG. 10B, which is a ray-fan plot when the lens module 100A is at the wide-end and the object light-beam L is infrared light. Referring to FIG. 10C, which is a ray-fan plot when the lens module 100 is at the tele-end and the object light-beam L is visible light. Referring to FIG. 10D, which is a ray-fan plot when the lens module 100 is at the tele-end and the object light-beam L is infrared light.

Figures 11A, 11B:
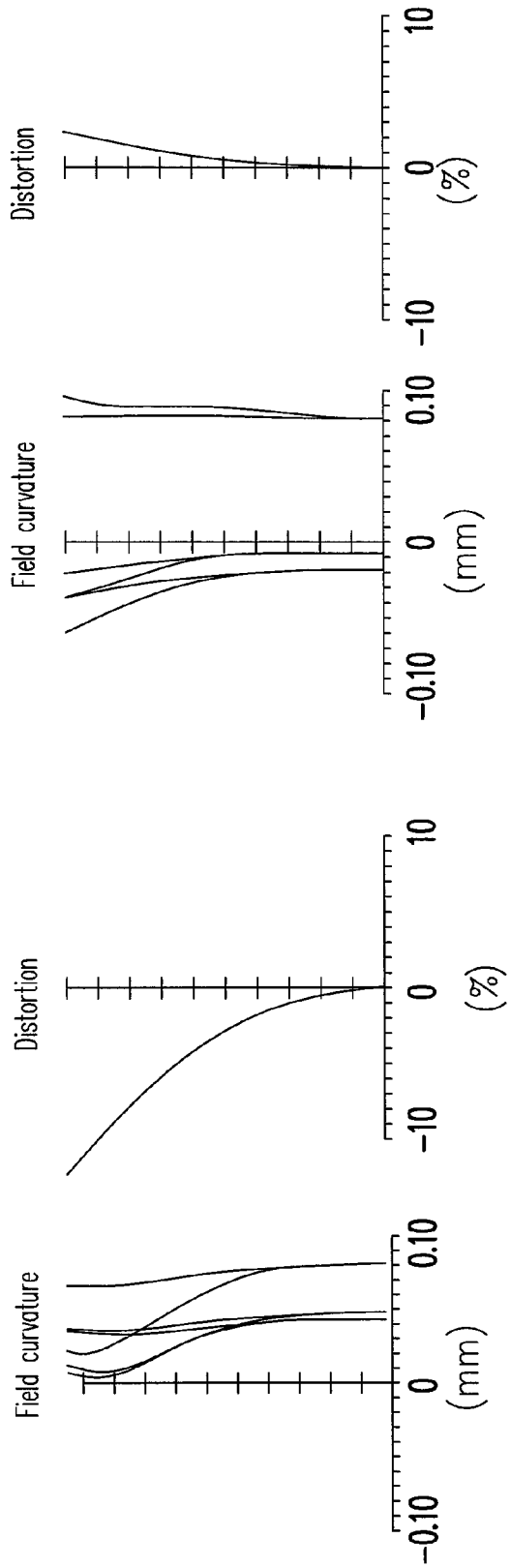
FIG. 11A is a plot of field curvature and distortion when the lens module is at the wide-end.
FIG. 11B is a plot of field curvature and distortion when the lens module is at the tele-end.

FIGS. 11A-11B are yet another group of imaging optical simulation data plots corresponding to the image apparatus of FIGS. 7A-8B. In FIG. 11A, a plot of field curvature (left) and a plot of distortion (right) are corresponding to the lens module 100A at the wide-end. In FIG. 11B, a plot of field curvature (left) and a plot of distortion (right) are corresponding to the lens module 100A at the tele-end. FIGS. 12A and FIG. 12B are respectively a lateral chromatic aberration plot corresponding to the lens module 100A at the wide-end and the tele-end. It can be seen in FIGS. 9A-12B, all the data in the plots are within the standard, it indicates the image apparatus 1000A of the embodiment is advantageous in not only high zoom magnification and high revolution, but also good image-capturing effect under the situations of the object light-beam L with different wavelength ranges.

In summary, in the lens module and the image apparatus of an embodiment of the invention, each one in the five lens groups respectively includes at least one positive lens and at least one negative lens, the refractive-powers of the five lens groups are sequentially positive, negative, positive, positive and positive. Moreover, any lens of the third lens group is a spherical lens. In this way, in addition to having high zoom magnification and high revolution, the lens module and the image apparatus of an embodiment of the invention can obtain good image-capturing effect under the different wavelength ranges of the object light-beam and further achieve good 24-hours confocal imaging quality.

The foregoing description of the preferred embodiments of the invention has been presented for purposes of illustration and description. It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter. In addition, any one of the embodiments or claims of the invention is not necessarily to achieve all of the above-mentioned objectives, advantages or features. The abstract and the title herein are used to assist searching the documentations of the relevant patents, not to limit the claim scope of the invention; the ordinal numbers prior to some elements, such as first, second and the like (first lens group and second lens group, for example), are used to represent the names of the elements only, not to restricts the upper limit or lower limit of the quantity of the elements.

What is claimed is:

1. A lens module, having an object-side and an image-side for capturing an object light-beam from the object-side, the lens module disposed on a transmission path of the object light-beam and comprising five lens groups sequentially-arranged from the object-side to the image-side:

a first lens group with positive refractive-power, wherein the first lens group comprises a first lens with positive refractive-power and a second lens with negative refractive-power;

a second lens group with negative refractive-power, wherein the second lens group comprises a third lens with positive refractive-power and a fourth lens with negative refractive-power;

a third lens group with positive refractive-power, wherein the third lens group comprises a fifth lens with positive refractive-power, a sixth lens with negative refractive-power, and a thirteenth lens with negative refractive-power located between the fifth lens and the second lens group, wherein the fifth lens, the sixth lens and the thirteenth lens form a cemented lens;

a fourth lens group with positive refractive-power, wherein the fourth lens group comprises a seventh lens with positive refractive-power and an eighth lens with negative refractive-power; and a fifth lens group with positive refractive-power, wherein the fifth lens group comprises a ninth lens with positive refractive-power and a tenth lens with negative refractive-power, wherein the first lens group, the third lens group and the fifth lens group are fixed groups, the second lens group and the fourth lens group are movable groups and each lens in the third lens group is a spherical lens.

2. The lens module as claimed in claim 1, wherein focal length of the second lens group is f2, focal length of the lens module at a wide-end is fW, focal length of the lens module at a tele-end is fT and the lens module satisfies a following condition expression:

$$0.4 < (f2/\sqrt{fW \times fT}) < 0.6.$$

3. The lens module as claimed in claim 1, wherein focal length of the fourth lens group is f4, focal length of the fifth lens group is f5 and the lens module satisfies a following condition expression:

$$0.25 < \left(\frac{f4}{f5}\right) < 0.65.$$

4. The lens module as claimed in claim 1, wherein the first lens of the first lens group is located between the second lens of the first lens group and the second lens group, and the first lens and the second lens are joined to each other to form a cemented lens.

5. The lens module as claimed in claim 1, wherein Abbe number of the first lens is V1, Abbe number of the second lens is V2, and V1 and V2 satisfy a following condition expression:

$$V1>70 \text{ and } V2<35.$$

6. The lens module as claimed in claim 1, wherein Abbe number of the fifth lens is V3 and V3 satisfies a following condition expression:

$$V3>70.$$

7. The lens module as claimed in claim 1, wherein the fourth lens group and the fifth lens group respectively comprise at least one aspheric lens.

8. The lens module as claimed in claim 1, wherein the first lens group further comprises an eleventh lens with positive refractive-power located between the first lens of the first lens group and the second lens group.

9. The lens module as claimed in claim 1, wherein the second lens group further comprises a twelfth lens with negative refractive-power located between the fourth lens and the first lens group.

10. The lens module as claimed in claim 1, wherein the third lens group further comprises a fourteenth lens with positive refractive-power located between the thirteenth lens and the second lens group.

11. The lens module as claimed in claim 1, wherein the seventh lens of the fourth lens group is located between the eighth lens of the fourth lens group and the third lens group, and the seventh lens is the aspheric lens.

12. The lens module as claimed in claim 1, wherein the ninth lens of the fifth lens group is located between the tenth lens of the fifth lens group and the fourth lens group, the ninth lens is the aspheric lens and the ninth lens and the tenth lens are formed a cemented lens.

13. The lens module as claimed in claim 1, further comprising an aperture stop located between the second lens group and the third lens group.

14. An image apparatus, capable of capturing an object light-beam from an object-side and comprising:

a photosensitive component disposed on a transmission path of the object light-beam and the photosensitive component corresponding to an image-side of the image apparatus; and a lens module, located between the photosensitive component and the object-side and the lens module disposed on a transmission path of the object light-beam and comprising five lens groups sequentially-arranged from the object-side to the image-side:

a first lens group with positive refractive-power, wherein the first lens group comprises a first lens with positive refractive-power and a second lens with negative refractive-power;

a second lens group with negative refractive-power, wherein the second lens group comprises a third lens with positive refractive-power and a fourth lens with negative refractive-power;

a third lens group with positive refractive-power, wherein the third lens group comprises a fifth lens with positive refractive-power, a sixth lens with negative refractive-power, and a thirteenth lens with negative refractive-power located between the fifth lens and the second lens group, wherein the fifth lens, the sixth lens and the thirteenth lens form a cemented lens;

a fourth lens group with positive refractive-power, wherein the fourth lens group comprises a seventh lens with positive refractive-power and an eighth lens with negative refractive-power; and a fifth lens group with positive refractive-power, wherein the fifth lens group comprises a ninth lens with positive refractive-power and a tenth lens with negative refractive-power, wherein the first lens group, the third lens group and the fifth lens group are fixed groups, the second lens group and the fourth lens group are removable groups and each lens in the third lens group is a spherical lens.

15. The image apparatus as claimed in claim 14, further comprising a light-emitting component for emitting an illumination light-beam towards the object-side, wherein the illumination light-beam has a first wavelength range and the illumination light-beam after being reflected by an object at the object-side is converted into the object light-beam.

16. The image apparatus as claimed in claim 15, wherein when a luminance at the object-side is less than a predetermined value, the light-emitting component is turned on to emit the illumination light-beam with the first wavelength range towards the object-side, wherein the first wavelength range of the illumination light-beam is the same as a wavelength range of infrared light.

17. The image apparatus as claimed in claim 15, further comprising a light-filtering component for blocking the illumination light beam with the first wavelength range, wherein when the luminance at the object-side is greater than the predetermined value, the light-filtering component moves on the transmission path of the object light-beam, when the luminance at the object-side is less than the predetermined value, the light-filtering component leaves from the transmission path of the object light-beam.

18. The image apparatus as claimed in claim 14, wherein focal length of the second lens group is f2, focal length of the image apparatus at a wide-end is fW, focal length of the image apparatus at a tele-end is fT and the lens module satisfies a following condition expression:

$0.4 < (f2/\sqrt{fW \times fT}) < 0.6$.

19. The image apparatus as claimed in claim 14, wherein focal length of the fourth lens group is f4, focal length of the fifth lens group is f5 and the lens module satisfies a following condition expression:

$$0.25 < \left(\frac{f4}{f5}\right) < 0.65.$$

20. The image apparatus as claimed in claim 14, wherein Abbe number of the first lens is V1, Abbe number of the second lens is V2, and V1 and V2 satisfy a following condition expression:

$V1 > 70$ and $V2 < 35$.

21. The image apparatus as claimed in claim 14, wherein Abbe number of the fifth lens is V3, and V3 satisfies a following condition expression:

$V3 > 70$.

22. The image apparatus as claimed in claim 14, wherein the fourth lens group and the fifth lens group respectively comprise at least one aspheric lens.

23. The image apparatus as claimed in claim 14, wherein the first lens of the first lens group is located between the second lens of the first lens group and the second lens group.

24. The image apparatus as claimed in claim 14, wherein the third lens of the second lens group further is located between the third lens group and the fourth lens of the second lens group and the third lens and the fourth lens are joined to each other to form a cemented lens.

25. The image apparatus as claimed in claim 14, wherein the third lens group further comprises a fourteenth lens with positive refractive-power located between the thirteenth lens and the second lens group.

26. The image apparatus as claimed in claim 14, wherein the seventh lens of the fourth lens group is located between the eighth lens of the fourth lens group and the third lens group, and the seventh lens is the aspheric lens.

27. The image apparatus as claimed in claim 14, wherein the ninth lens of the fifth lens group further is located between the tenth lens of the fifth lens group and the fourth lens group, the ninth lens is the aspheric lens, and the ninth lens and the tenth lens are formed a cemented lens.

28. The image apparatus as claimed in claim 14, further comprising an aperture stop located between the second lens group and the third lens group.

* * * * *